US011790409B2

(12) United States Patent
Ishikawa

(10) Patent No.: US 11,790,409 B2
(45) Date of Patent: Oct. 17, 2023

(54) INFORMATION PROCESSOR AND INFORMATION PROCESSING METHOD

(71) Applicant: Paramount Bed Co., Ltd., Tokyo (JP)

(72) Inventor: Takashi Ishikawa, Tokyo (JP)

(73) Assignee: Paramount Bed Co., Ltd., Tokyo (JP)

( * ) Notice: Subject to any disclaimer, the term of this patent is extended or adjusted under 35 U.S.C. 154(b) by 0 days.

(21) Appl. No.: 17/047,567

(22) PCT Filed: May 10, 2019

(86) PCT No.: PCT/JP2019/018768
§ 371 (c)(1),
(2) Date: Oct. 14, 2020

(87) PCT Pub. No.: WO2020/129275
PCT Pub. Date: Jun. 25, 2020

(65) Prior Publication Data
US 2021/0304250 A1 Sep. 30, 2021

(30) Foreign Application Priority Data
Dec. 21, 2018 (JP) .................. 2018-240301

(51) Int. Cl.
*G06Q 30/0241* (2023.01)
*G06Q 30/0251* (2023.01)
(Continued)

(52) U.S. Cl.
CPC ......... *G06Q 30/0276* (2013.01); *G06F 18/22* (2023.01); *G06Q 30/0256* (2013.01); *G06Q 30/0631* (2013.01)

(58) Field of Classification Search
CPC ........... G06Q 30/0256; G06Q 30/0276; G06Q 30/0631; G06Q 30/02;
(Continued)

(56) References Cited

U.S. PATENT DOCUMENTS 8,239,287 B1 8/2012 Smith et al.
2003/0221258 A1 12/2003 Nagaoka et al.
(Continued)

FOREIGN PATENT DOCUMENTS

JP 2002-251465 A 9/2002
JP 2006-091983 A 4/2006
(Continued)

OTHER PUBLICATIONS

Baxter et al., Ads aimed at dads: Exploring consumers' reactions towards advertising that conforms and challenges traditional gender role ideologies. International Journal of Advertising 35.6 (2016): 970-982 (Year: 2016).*

(Continued)

*Primary Examiner* — Christopher B Tokarczyk
(74) *Attorney, Agent, or Firm* — Harness, Dickey & Pierce, P.L.C.

(57) ABSTRACT

Provided an information processor capable of proposing more useful items to a user. An information processor includes: a processor; and a memory. The memory holds: first information on a relationship between a first assistant and a first person to be assisted who is assisted by the first assistant; second information on a relationship between a second assistant and a second person to be assisted who is assisted by the second assistant; third information on an item purchase history of the first assistant and/or the first person to be assisted; and fourth information on an item purchase history of the second assistant and/or the second person to be assisted. The processor judges a similarity between the first information and the second information, and provides an advertisement based on the fourth information to the first assistant and/or the first person to be assisted if judging that a similarity is observed between the first information and the second information.

20 Claims, 25 Drawing Sheets

(51) Int. Cl.
*G06Q 30/0601* (2023.01)
*G06F 18/22* (2023.01)

(58) Field of Classification Search
CPC .... G06Q 30/0207–0277; G06K 9/6215; G06F 16/00
See application file for complete search history.

(56) References Cited

U.S. PATENT DOCUMENTS

| | | | | |
|---|---|---|---|---|
| 2006/0247968 | A1* | 11/2006 | Kadry | G06Q 30/0203 705/14.53 |
| 2010/0088177 | A1* | 4/2010 | Lu | G06N 5/022 705/14.43 |
| 2014/0095326 | A1* | 4/2014 | Adam | G06Q 30/0273 705/14.73 |
| 2014/0337048 | A1* | 11/2014 | Brown | G06F 3/167 705/2 |
| 2016/0067127 | A1 | 3/2016 | Shimada et al. | |
| 2018/0342329 | A1* | 11/2018 | Rufo | G08B 25/10 |

FOREIGN PATENT DOCUMENTS

| | | | |
|---|---|---|---|
| JP | 2010-205263 | A | 9/2010 |
| JP | 2012-252534 | A | 12/2012 |
| JP | 2013167917 | A | 8/2013 |
| JP | 2018045288 | A | 3/2018 |
| JP | 2018101323 | A | 6/2018 |

OTHER PUBLICATIONS

International Preliminary Report on Patentability dated Jul. 1, 2021.
International Search Report PCT/ISA/210 for International Application No. PCT/JP2019/018768 dated Jul. 30, 2019.
Sunao Uchida et al, "Sleep evaluation by a newly developed PVDF sensor non-contact sheet: a comparisin with standard polysomnography and wrist actigraphy" Journal of Japanese Society of Sleep Research, issued Jul. 2011.
Office Action dated Apr. 26, 2022 issued in corresponding Japanese Patent Application No. 2018-240301.
Office Action dated Jun. 27, 2023 issued in corresponding Japanese Patent Application No. 2022-159662.

\* cited by examiner

FIG. 3A

|  | HEIGHT[cm] | WEIGHT [kg] | SEX | NECESSARY NURSING CARE CONTENTS ETC. |
|---|---|---|---|---|
| CARER A |  |  |  |  |
| PERSON TO BE CARED FOR A' |  |  |  |  |
| CARER B |  |  |  |  |
| PERSON TO BE CARED FOR B' |  |  |  |  |
| CARER C |  |  |  |  |
| PERSON TO BE CARED FOR C' |  |  |  |  |
| ⋮ | ⋮ | ⋮ | ⋮ | ⋮ |

FIG. 3B

|  | TIME | MEASUREMENT VALUE | TIME | MEASUREMENT VALUE | ...... |
|---|---|---|---|---|---|
| SENSOR S1 |  |  |  |  | ...... |
| SENSOR S2 |  |  |  |  | ...... |
| SENSOR S3 |  |  |  |  | ...... |
| ⋮ | ⋮ | ⋮ | ⋮ | ⋮ | ⋱ |

FIG. 3C

|  | ENVIRONMENT INFORMATION |
|---|---|
| CARER A / PERSON TO BE CARED FOR A' | CN1 |
| CARER B / PERSON TO BE CARED FOR B' | CN2 |
| CARER C / PERSON TO BE CARED FOR C' | CN3 |
| ⋮ | ⋮ |

FIG. 16C

| PHYSICAL CONDITION | | | |
|---|---|---|---|
| HEIGHT | cm | WEIGHT | kg |
| ROLLING OVER IN BED | ○POSSIBLE WITHOUT HANGING ON<br>○POSSIBLE IF HANGING ON TO SOMETHING  ○IMPOSSIBLE | | |
| GETTING UP IN BED | ○POSSIBLE WITHOUT HANGING ON<br>○POSSIBLE IF HANGING ON TO SOMETHING  ○IMPOSSIBLE | | |
| STANDING UP | ○POSSIBLE WITHOUT HANGING ON<br>○POSSIBLE IF HANGING ON TO SOMETHING  ○IMPOSSIBLE | | |
| WALKING INSIDE | ○POSSIBLE WITHOUT HANGING ON<br>○POSSIBLE IF HANGING ON TO SOMETHING  ○IMPOSSIBLE | | |
| WALKING OUTSIDE | ○POSSIBLE WITHOUT HANGING ON<br>○POSSIBLE IF HANGING ON TO SOMETHING  ○IMPOSSIBLE | | |
| ⋮ | ⋮ | | |
| DISEASE | | | |
| MATTER TO BE NOTED | | | |

| NURSING CARE ENVIRONMENT | |
|---|---|
| OTHER SERVICE USING CONDITION | |
| WELFARE EQUIPMENT BEING USED | |
| MATTER TO BE NOTED | |
| ⋮ | ⋮ |

FIG. 16D

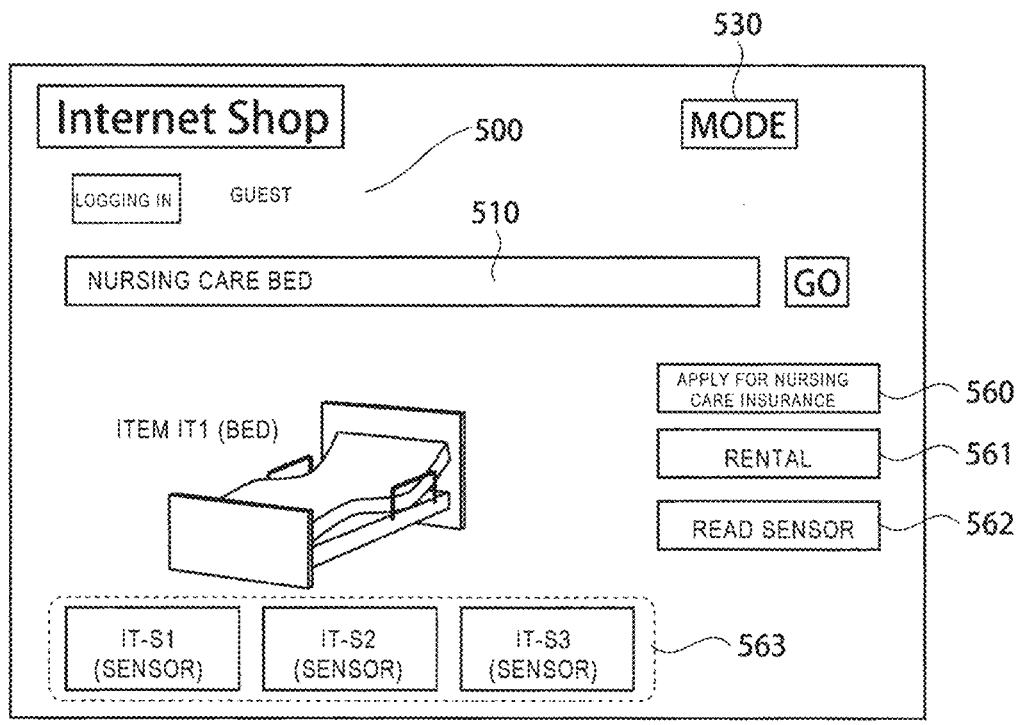

INFORMATION PROCESSOR AND INFORMATION PROCESSING METHOD

TECHNICAL FIELD

Embodiments relate to an information processor and an information processing method.

BACKGROUND ART

To deal with an aging society, demand for nursing care items etc. is expected to increase more rapidly.

CITATION LIST

Patent Literature

PTL 1: U.S. Pat. No. 8,239,287

SUMMARY OF INVENTION

Technical Problem

Provided is an information processor and an information processing method capable of proposing more useful items to a user.

Solution to Problem

An information processor according to this embodiment includes: a processor; and a memory. The memory holds: first information on a relationship between a first assistant and a first person to be assisted who is assisted by the first assistant; second information on a relationship between a second assistant and a second person to be assisted who is assisted by the second assistant; third information on an item purchase history of the first assistant and/or the first person to be assisted; and fourth information on an item purchase history of the second assistant and/or the second person to be assisted. The processor judges a similarity between the first information and the second information. Then, the processor provides an advertisement based on fourth information to the first assistant and/or the first person to be assisted if judging that a similarity is observed between the first information and the second information.

Advantageous Effects of Invention

It is possible to provide an information processor and an information processing method capable of proposing more useful items to a user.

BRIEF DESCRIPTION OF DRAWINGS

FIG. 3A is a conceptual diagram of first information according to the first embodiment.

FIG. 3B is a conceptual diagram of second information according to the first embodiment.

FIG. 3C is a conceptual diagram of third information according to the first embodiment.

FIG. 16C is a conceptual diagram illustrating an example of the user terminal screen observed when the advertisement method according to the third embodiment is executed.

FIG. 16D is a conceptual diagram illustrating an example of the user terminal screen observed when the advertisement method according to the third embodiment is executed.

DESCRIPTION OF EMBODIMENTS

Figure 1:
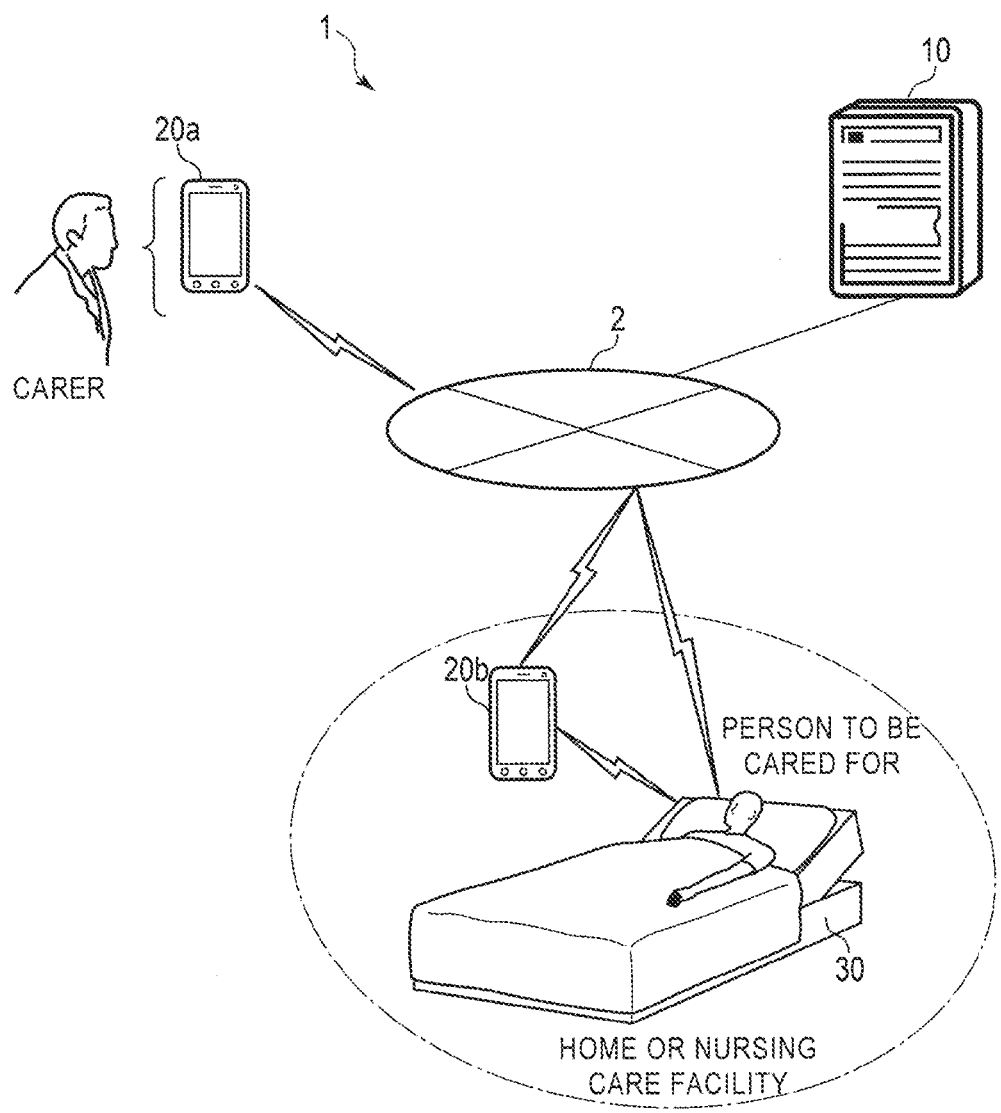
FIG. 1 is a conceptual diagram of an advertisement providing system according to a first embodiment.

Hereinbelow, embodiments are described with reference to the drawings. In this description, common parts are given common reference numerals throughout the drawings.

1. First Embodiment

An information processor according to a first embodiment of this invention is described with an advertisement providing system taken as an example. The advertisement providing system according to this embodiment provides advertisements on nursing care items and the like effectively to a person to be cared for who needs nursing care (or assistance, hereinafter referred to uniformly as "nursing care") due to sickness or aging and to a carer who cares for the person to be cared for. In one example, the person to be cared for is an elderly sick patient, and the carer is his/her family. Alternatively, the person to be cared for is an elderly person, and the carer is a staff who works for a nursing care facility. In another example, the person to be cared for is a young person who becomes physically disabled due to a reason such as a traffic accident or a sickness, and the carer is a person such as his/her family, friend, and nursing care facility staff. Naturally, the embodiment may include other cases.

1.1 Configuration 1.1.1 About Overall Configuration

FIG. 1 is a conceptual diagram of the advertisement providing system according to this embodiment. As illustrated in the drawing, a system 1 includes: a server 10; information terminals 20a and 20b; and a nursing care bed (and accompanying sensors) 30. The server 10, the information terminals 20a and 20b, and the bed (and sensors) 30 are connected to each other through a network (such as the Internet) so that they can communicate with each other.

The server 10 is configured to hold information on the carer and the person to be cared for and item information. The server 10 is also configured to provide advertisements to the carer and the person to be cared for and accept orders from the carer and the person to be cared for.

The information terminal 20a can be connected to a network 2 via wireless or wired communication. The information terminal 20a is configured to accept data inputs from the carer, and send them to the server 10 via the network 2. In addition, the information terminal 20a is configured to receive data from the server 10, and display images based on the received data on a display. In this example, the server 10 displays advertisements on items to be recommended to the carer on a display of the information terminal 20a, for example. Further, the information terminal 20a is configured to accept inputs informing of purchase of an item by the carer, and send them to the server 10. Examples of the information terminal 20a include a smartphone, a tablet PC, a notebook PC, and a desktop PC, for example, but the information terminal 20a is not limited to these.

The bed 30 is a bed designed for nursing care, for example, and is used by the person to be cared for. Accordingly, the bed 30 is equipped with various functions such as aback raising function, a height adjustment function, and a knee raising function. Examples of such a bed are stated in U.S. patent application Ser. No. 14/785,671, filed on Oct. 20, 2015, titled "BED APPARATUS", and U.S. patent application Ser. No. 10/411,083, filed on Apr. 11, 2003, titled "METHOD OF CONTROLLING THE COORDINATIVE LIFTING OF BOTTOM SECTIONS OF LYING FURNITURE SUCH AS A BED", for example. The entire contents of these patent applications are incorporated in the specification of this application by reference. The bed 30 further includes various sensors. These sensors are configured to detect whether or not the function such as the back raising function has been used, detect weight on the bed, or detect vital data such as a blood pressure and heartbeat of the person to be cared for. Examples of such sensors include a body motion sensor, for example. As an example of a method of detecting a body motion, the method stated in "Sleep evaluation by a newly developed PVDF sensor non-contact sheet: a comparison with standard polysomnography and wrist actigraphy" which is written by Sunao UCHIDA, Takuro ENDO, Kazue SUENAGA, Hideto IWAMI, Shinsuke INOUE, Eiji FUJIOKA, Ayako IMAMURA, Takafumi ATSUMI, Yoshitaka INAGAKI and Atsushi KAMEI in the Journal of Japanese Society of Sleep Research issued in July 2011 can be used, for example. The entire contents of this literature are also incorporated in the specification of this application by reference. The sensors can be connected to the network 2 via wireless or wired communication, and send the detected data to the server 10. Alternatively, the sensors may be connected to the network 2 by wireless communication that uses the information terminal 20b as a base station (also referred to as an access point, a station, a master device, and the like). The bed 30 may be installed in the home of the person to be cared for, or alternatively may be installed in a nursing care facility or a medical institution.

The information terminal 20b can be connected to the network 2 via wireless or wired communication. The information terminal 20b is configured to accept data inputs from the person to be cared for (and the carer), and send them to the server 10 via the network 2. In addition, as in the information terminal 20a, the information terminal 20b is configured to receive data from the server 10, and display images based on the received data on a display. The information terminal 20b is also a medium such as a smartphone, a tablet PC, a notebook PC, and a desktop PC, but is not limited to these. Note that, since the information terminal 20b is mainly used by the person to be cared for, it may be equipped in the bed 30. Hereinafter, a combination of the person to be cared for and the carer who cares for the person to be cared for or any one of them is sometimes simply referred to as a "user". In addition, although only a pair of users is illustrated in FIG. 1, two pairs or more of users are typically registered in the server 10, and these multiple users communicate with the server 10.

1.1.2 About Configuration of Server 10

Figure 2:
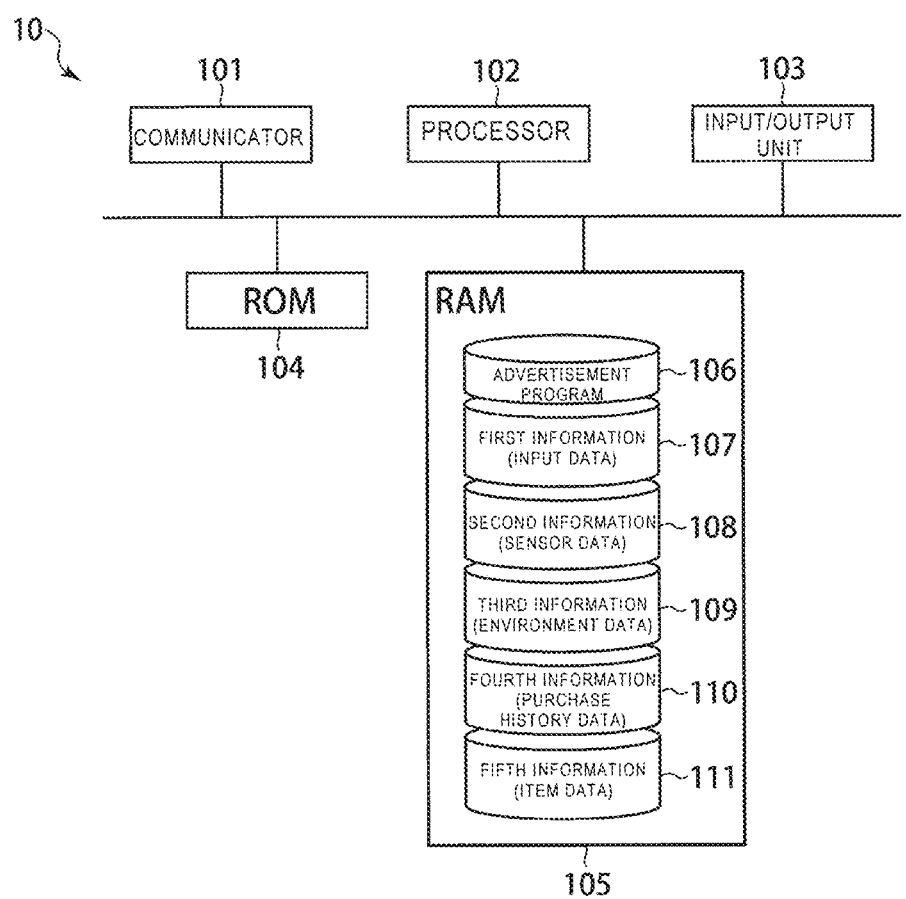
FIG. 2 is a block diagram of a server according to the first embodiment.

Next, the configuration of the above server 10 is described using FIG. 2. FIG. 2 is a block diagram illustrating an example of the hardware configuration of the server 10. As illustrated in the drawing, the server 10 includes: a communicator 101; a processor 102; an input/output unit 103; a ROM 104; and a RAM 105.

The communicator 101 is configured to transmit and receive information to and from the network 2 by wireless or wired communication. The input/output unit 103 is configured to accept commands from a server administrator, and display results of processing by the processor 102, for example. The memory (such as a ROM) 104 is configured to hold programs (such as an operating system) to be executed by the processor 102 and necessary data. The memory (such as a RAM) 105 functions as a work area of the processor 102. The RAM 105 is configured to hold various programs and data. The processor 102 is configured to operate and provide effective advertisements to the user by executing the programs inside the ROM 104 and the RAM 105.

The programs and data held by the above RAM 105 are described below. As illustrated in FIG. 2, the RAM 105 holds an advertisement program 106, and first information 107 to fifth information 111.

First, the first information 107 is described using FIG. 3A. FIG. 3A illustrates the concept of the first information. As illustrated in the drawing, the first information 107 holds, for each user, information unique to the user regarding nursing care. For example, the first information 107 according to the example in FIG. 3A includes, for each pair of the carer and the person to be cared for, information on the person to be cared for and the height, weight, and sex of the person to be cared for, on the nursing care contents requested for the person to be cared for, and the like. There are various examples of the nursing care contents including getting up assistance, change of clothes assistance, meal assistance, diaper change support, bathing support, coaching on exercise menu such as fall prevention workout, and watching over, for example. FIG. 3A illustrates a case in which the first information includes information on three pairs of the carer and the person to be cared for, i.e. a carer A and a person to be cared for A' who is cared for by the carer A, a carer B and a person to be cared for B' who is cared for by the carer B, and a carer C and a person to be cared for C' who is cared for by the carer C (hereinafter, such relationship is sometimes referred to as users A/A', B/B', and C/C'). These sets of information are sent from the information terminal 20a and/or the information terminal 20b to the server 10 and stored in the RAM 105 in advance.

Next, the second information 108 is described using FIG. 3B. FIG. 3B illustrates the concept of the second information 108. As illustrated in the drawing, the second information 108 holds data received from the sensors of the bed 30. The sensors may send data continuously, or alternatively may send data discretely at constant intervals or at predetermined intervals, for example. For example, the second information 108 according to the example in FIG. 3B includes measurement values acquired by three sensors S1, S2, and S3 and the time when these measurement values are acquired. Note that, although not illustrated in FIG. 3B, the data held in FIG. 3B is held in association with the user. In other words, the data included in the second information 108 is stored in the RAM 105 in such a way that it is clearly identifiable from which of the persons to be cared for the data is acquired via his/her sensors.

Next, the third information 109 is described. FIG. 3C illustrates the concept of the third information 109. As illustrated in the drawing, the third information 109 holds environment data CN (CN1, CN2, . . . ) for each person to be cared for and carer. The environment data CN is data on the life environments of the carers and the persons to be cared for registered in the first information 107. In some cases, the environment data may include only data on the life environments of the persons to be cared for without including data on the carers. The environment data CN may be data that is sent to the server 10 by the carer and/or the person to be cared for, for example, via the information terminal 20a and/or the information terminal 20b, for example, or alternatively may be information that is acquired from the sensors mounted on the bed 30 and the like. An example of the environment data CN is information on life patterns of the carer and the person to be cared for. For example, the environment data CN is information as follows. The carers A and B need to take the persons to be cared for A' and B' to their hospitals once a week. In this event, the carer A uses a car, so the walking distance of the person to be cared for A' is short; on the other hand, the person to be cared for B' walks to the hospital and the carer B attends on the person to be cared for B', so the walking distance of the person to be cared for B' is long. Alternatively, the environment data CN is such information that the person to be cared for A' takes a walk for about an hour about once every two weeks while the person to be cared for B' takes a walk about 30 minutes almost every day. In this way, the third information 109 includes all types of information. Accordingly, in this embodiment, the third information 109 is simply referred to as environment data information CN.

Next, the fourth information 110 is described. The fourth information 110 is information on past item (including streaming items) purchase histories of the carers and the persons to be cared for registered in the first information 107. Here, the fourth information 110 may hold not only information on items but also information on the time and date the items are purchased and information on the relationship between the carer and the person to be cared for (i.e. first information 107), sensor data (i.e. second information 108), and the life environments of the carer and the person to be cared for (i.e. third information 109) at the time when each item is purchased, for example.

The fifth information 111 is information on items dealt with in the advertisement system 1 managed using the server 10. The system deals with various items. Accordingly, in the fifth information 111, multiple items may be categorized according to various conditions.

Figure 4:
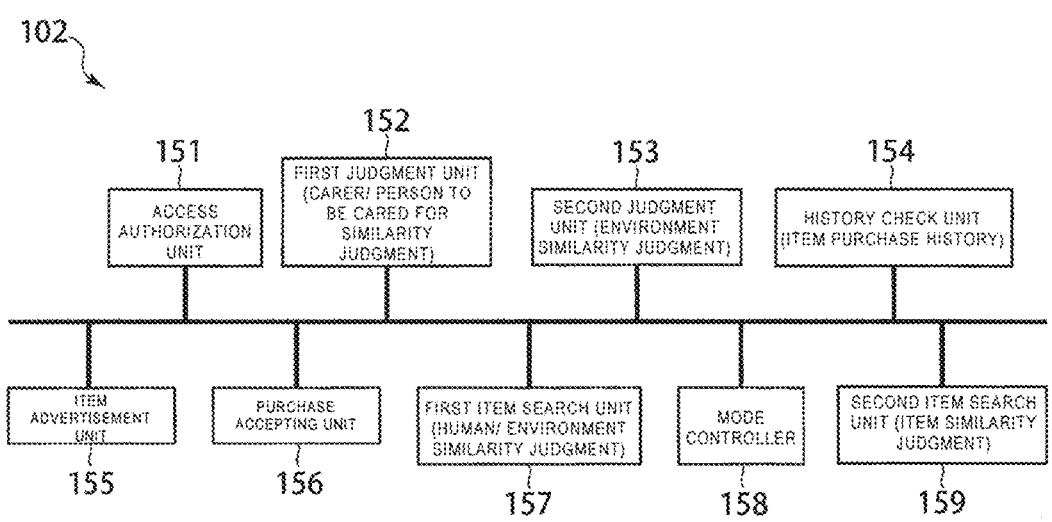
FIG. 4 is a functional block diagram of a processor of the server according to the first embodiment.

The advertisement program 106 is executed by the processor 102 to cause the processor 102 to display various advertisements of items on the user's information terminals 20a and 20b using the first information 107 to fifth information 111 described above. FIG. 4 is a functional block diagram of the processor 102 at the time of executing the advertisement program 106. As illustrated in the drawing, by executing the advertisement program 106, the processor 102 functions as an access authorization unit 151, a first judgment unit 152, a second judgment unit 153, a history check unit 154, an item advertisement unit 155, a purchase accepting unit 156, a first item search unit 157, a mode controller 158, and a second item search unit 159.

The access authorization unit 151 is configured to control user's access to a website of the advertisement providing system according to this embodiment. In other words, the access authorization unit 151 is configured to authenticate user's identity using a password and ID etc. authentication system, and authorize or prohibit user's access to the website.

The first judgment unit 152 is configured to judge, when displaying advertisements on the information terminals 20a and 20b of a certain user, the similarity in the relationship between the carer and the person to be cared for based on the first information 107, for example. More specifically, the first judgment unit 152 is configured to search for another user whose relationship between the carer and the person to be cared for is similar to the user to which advertisements are to be displayed. The similarity in the relationship between the carer and the person to be cared for in this example is now described. The similarity in the relationship between the carer and the person to be cared for is determined based on the relative relationship between the carer and the person to be cared for with respect to their height, weight, sex, necessary nursing care contents and the like.

For example, assume a case in which the difference in height between the carer A and the person to be cared for A' is equal to or larger than 20 cm and smaller than 30 cm for example, the difference in weight between them is equal to or larger than 20 kg and smaller than 30 kg for example, the sex of the carer A is female and the sex of the person to be cared for A' is male, and they fall within a first condition under which a person requests nursing care and the like. In this case, this situation is considered to be a situation in which their physique difference is large and thus this puts a heavy burden on the carer A.

Meanwhile, assume a case in which the difference in height between the carer B and the person to be cared for B' is equal to or larger than 5 cm and smaller than 10 cm for example, the difference in weight between them is equal to or larger than 30 kg and smaller than 40 kg for example, the sex of the carer B is female and the sex of the person to be cared for B' is male, and they fall within the first condition under which a person requests nursing care and the like. In this case, this situation is considered to be a situation in which their height difference is small but weight difference is large, and thus this puts a heavy burden on the carer B. The nursing care contents requested are almost the same as those for the person to be cared for A'. Accordingly, it is possible to judge that a similarity is observed between the relationship between the carer A and the person to be cared for A' and the relationship between the carer B and the person to be cared for B'. However, if the person to be cared for A' requests extremely light nursing care (nursing care that falls within the first condition) whereas the person to be cared for B' requests full assistance (nursing care that falls within a second condition), for example, it is possible to judge that the physique difference is similar but no similarity is observed between the relationship between the carer A and the person to be cared for A' and the relationship between the carer B and the person to be cared for B'.

Meanwhile, assume a case in which the difference in height between the carer C and the person to be cared for C' is equal to or larger than 40 cm and smaller than 50 cm for example, the difference in weight between them is equal to or larger than 50 kg and smaller than 60 kg for example, both the sex of the carer C and the sex of the person to be cared for C' are male, and they fall within the first condition under which a person requests nursing care and the like. In this case, this situation is considered to be a situation in which the carer is male but their height difference and weight difference are large, and thus this puts a heavy burden on the carer C. In this case, the relationship between them is similar to the relationship between the carer A and the person to be cared for A' in terms of the point that the carer bears a heavy burden, but the physique difference between the carer C and the person to be cared for C' is too large. Accordingly, in such a case, it is possible to judge that no similarity is observed between the relationship between the carer A and the person to be cared for A' and the relationship between the carer C and the person to be cared for C'.

A similarity in the relationship between the carer and the person to be cared for may be judged using another criteria. For example, the first judgment unit 152 judges a similarity in terms of the situation of nursing care for the person to be cared for based on the first information 107 (and the second information 108) for example. More specifically, the first judgement unit 152 searches for another user (person to be cared for) who is similar in terms of the nursing care situation of the person to be cared for to which advertisements are to be displayed. The similarity in terms of the nursing care situation in this example is now described.

For example, assume a case in which the person to be cared for A' requests full assistance, and in which the person to be cared for B' does not request full assistance and can take a meal by himself/herself, but finds it difficult to walk by himself/herself and needs bathing assistance and excretion assistance. In this case, it is possible to say that the person to be cared for B' is in a situation quite close to a situation in which full assistance is requested. Accordingly, in this case, it is possible to judge that a similarity is observed between the nursing care situation of the person to be cared for A' and the nursing care situation of the person to be cared for B'.

On the other hand, assume a case in which the person to be cared for C' can walk, take a meal, and excrete waste materials by himself/herself, but needs bathing assistance. In this case, it is possible to judge that the person to be cared for C' needs more minor nursing care contents than those for the person to be cared for A', and that no similarity is observed between their nursing care situations.

Meanwhile, the nursing care situation of the person to be cared for may be based not only on the first information 107 but also on the second information 108 received from the sensors. Specifically, the nursing care situation of the person to be cared for varies with time. Accordingly, the first judgment unit 152 may judge the nursing care situation of the person to be cared for based on the data received from the sensors in real time. An example of the method of judging the nursing care situation based on the data received from the sensors will be described in a third embodiment.

Meanwhile, in the Japanese nursing care insurance system, the nursing care level to be certified differs depending on the condition of the person to be cared for. Accordingly, the first judgment unit 152 may judge the similarity based on this nursing care level. The nursing care level is briefly described below. The nursing care level is basically determined based on the nursing care need certification etc. reference time. The nursing care need certification etc. reference time is determined in consideration of five fields of: direct life assistance; indirect life assistance; BPSD (Behavioral and Psychological Symptoms of Dementia) related acts; functional training related acts; and medical related acts. The nursing care level is determined based on the following criteria (secondary judgment by the nursing care certification examining board is further needed for final nursing care need certification).

Need of Assistance 1: a condition in which the nursing care need certification etc. reference time is equal to or larger than 25 minutes and smaller than 32 minutes, or an equivalent condition.

Need of Assistance 2/Need of Nursing Care 1: a condition in which the nursing care need certification etc. reference time is equal to or larger than 32 minutes and smaller than 50 minutes, or an equivalent condition.

Need of Nursing Care 2: a condition in which the nursing care need certification etc. reference time is equal to or larger than 50 minutes and smaller than 70 minutes, or an equivalent condition.

Need of Nursing Care 3: a condition in which the nursing care need certification etc. reference time is equal to or larger than 70 minutes and smaller than 90 minutes, or an equivalent condition.

Need of Nursing Care 4: a condition in which the nursing care need certification etc. reference time is equal to or larger than 90 minutes and smaller than 110 minutes, or an equivalent condition.

Need of Nursing Care 5: a condition in which the nursing care need certification etc. reference time is equal to or larger than 110 minutes, or an equivalent condition.

Which nursing care level the person to be cared for is in can be acquired from the first information 107, for example. For example, the first judgment unit 152 judges that a similarity is observed between Need of Assistance 1 and Need of Assistance 2, between Need of Nursing Care 2 and Need of Nursing Care 3, between Need of Nursing Care 3 and Need of Nursing Care 4, and between Need of Nursing Care 4 and Need of Nursing Care 5. Needless to say, this example is also merely an example, and a similarity in the nursing care situation can be judged based on other criteria.

Note that, the above is merely an example, and the first judgment unit 152 judges a similarity between the carer and the person to be cared for based on various conditions.

The second judgment unit 153 is configured to judge, when displaying advertisements on the information terminals 20*a* and 20*b* of a certain user, a similarity in environment based on the third information 109, for example. More specifically, the second judgment unit 153 is configured to search for another user whose life environment is similar to the user to which advertisements are to be displayed. The similarity in environment in this example is described.

As described previously, assume a case in which the persons to be cared for A' and B' go to their hospitals once a week. In this event, the person to be cared for A' goes to the hospital by car and has few chances to walk; on the other hand, the person to be cared for B' walks to the hospital and also has many other chances to walk. In such a case, it is possible to say that the similarity between their life environments is low at least in terms of the point "walk". Meanwhile, assume a case in which the person to be cared for C' takes a walk for an hour every day. In such a case, although there is a slight difference in walking level, a certain degree of similarity in environment can be observed between the persons to be cared for C' and B'.

In this manner, the second judgment unit 153 judges a similarity between the carer and the person to be cared for in terms of life environment.

The history check unit 154 is configured to refer to the fourth information 110 when displaying advertisements on the information terminals 20*a* and 20*b* of a certain user, and check items each user has purchased in the past. Note, however, that advertisements to be displayed are not necessarily limited to the past purchase items held in the fourth information 110. In such a case, the history check unit 154 does not need to refer to the fourth information. For example, the first item search unit 157 and the second item search unit 159 may determine to advertise current hot selling items irrespective of the purchase history.

The first item search unit 157 determines items to be displayed on the information terminals 20*a* and 20*b* of the user based on the result of similarity judgment made by the first judgment unit 152 and the second judgment unit 153. The mode controller 158 is configured to activate or inactivate the second item search unit 159. The second item search unit 159 is configured to determine, when being activated by the mode controller 158, items to be displayed on the information terminals 20*a* and 20*b* of the user from a more detailed point of view than that of the first item search unit 157. The operations of the first item search unit 157 and the second item search unit 159 will be described in detail later in Section 1.2.

The item advertisement unit 155 is configured to cause the communicator to send advertisement information on the items determined by the first item search unit 157 and the second item search unit 159 to the information terminals 20*a* and 20*b*.

The purchase accepting unit 156 is configured to accept item purchase requests from the user, and control subsequent processes such as a payment method and an item shipping method.

1.2 Operation

Figure 5:
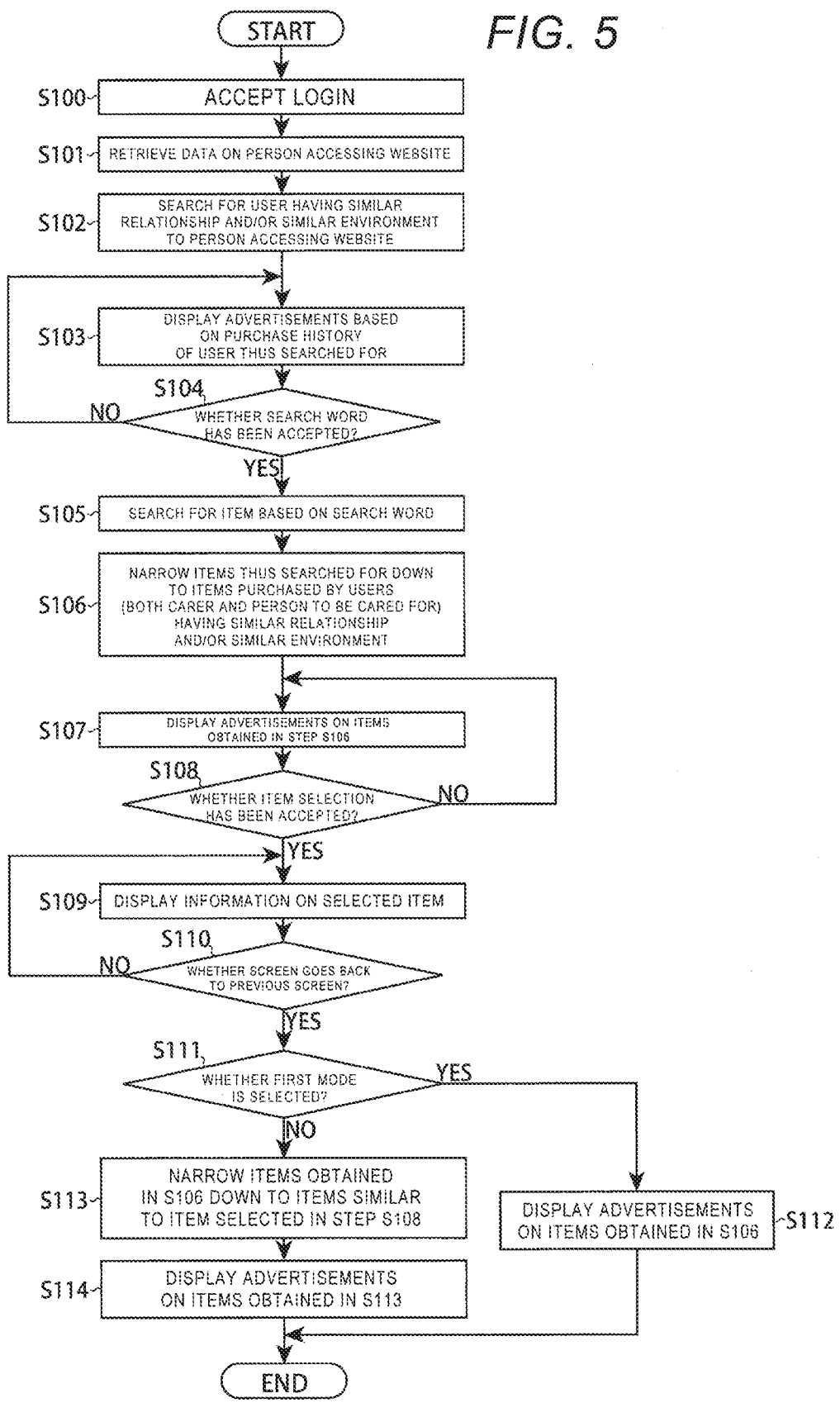
FIG. 5 is a flowchart illustrating an operation of the server according to the first embodiment.

Next, the operation of the advertisement providing system according to this embodiment is described while particularly focusing on the operation of the server 10. FIG. 5 is a flowchart illustrating the operation of the server 10, in which each process is executed mainly by the processor 102. In this example, a description is provided with an example in which advertisements are provided to a first user (the carer A and the person to be cared for A') who has applied for the application of the nursing care insurance system at the website of this advertisement providing system and purchased or rented a nursing care bed in the past, for example.

As illustrated in the drawing, when the first user purchases the nursing care bed, the server 10 accepts information on the height, weight, and the like of the first user from the information terminal 20*a* and/or the information terminal 20*b* of the first user. Thereby, the first information 107 on the first user is held in the RAM 105. In addition, the nursing care level certified in the nursing care insurance system is also held in the first information 107 at any proper timing. Then, the nursing care bed is shipped to the first user together with the necessary sensors accompanying the nursing care bed. Thereafter, the server 10 accepts data from the sensors via the network 2. Thereby, the second information 108 on the first user is held in the RAM 105.

Assume a case in which the server accepts login to the website of this advertisement providing system from the first user after the first user starts using the nursing care bed (Step S100). As described previously, the processing in Step S100 is executed by the access authorization unit 151. Once the access authorization unit 151 authorizes an access by the first user, the first judgment unit 152 and the second judgment unit 153 retrieve data on the first user (Step S101). Then, as described above, based on the first information 107 and the second information 108 for example, the first judgment unit 152 searches for another user whose relationship between the carer and the person to be cared for is similar to the first user. Meanwhile, based on the third information for example, the second judgment unit 153 searches for another user whose life environment is similar to the first user (Step S102). Then, if the judgment units succeed in finding another user who is similar in the relationship between the carer and the person to be cared for and in life environment, the history check unit 154 and the item advertisement unit 155 display item advertisements based on the past purchase history of the user thus found (Step S103).

Figure 6:
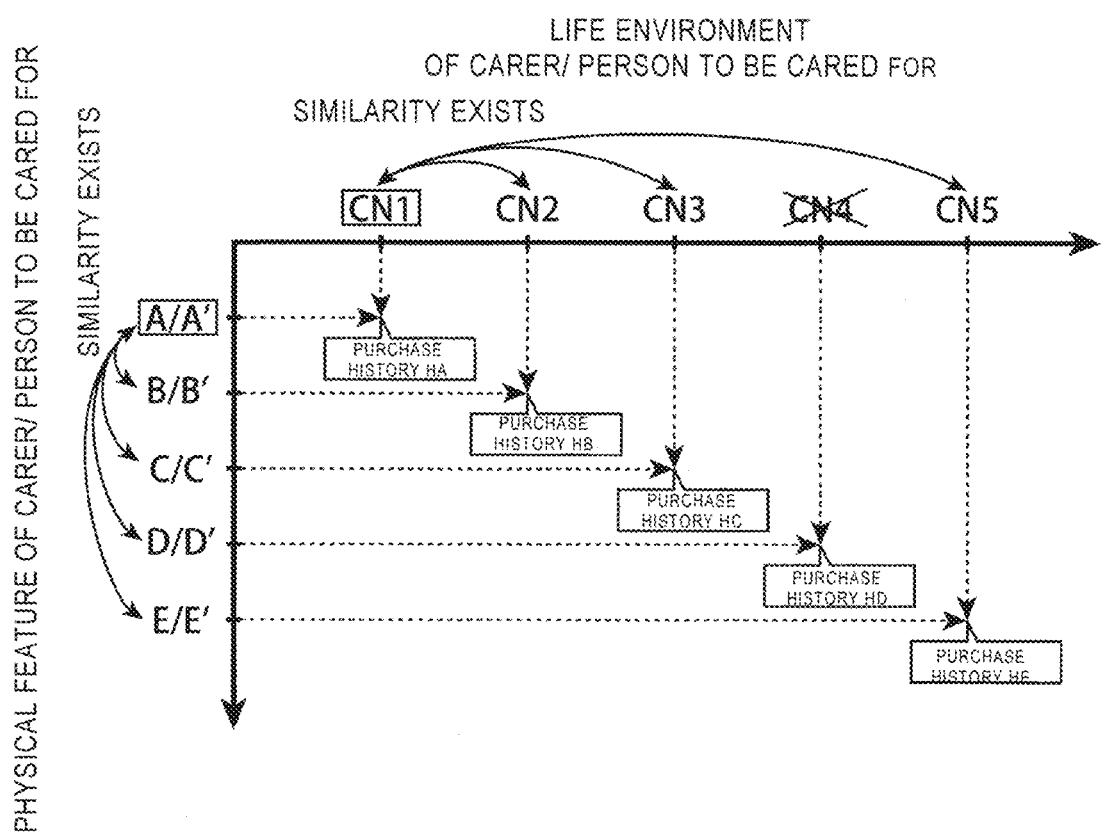
FIG. 6 is a conceptual diagram of an advertisement method according to the first embodiment.

The concept of the processing in Steps S102 and S103 is described using FIG. 6. FIG. 6 is a graph in which the vertical axis illustrates the similarity between the carer and the person to be cared for and the horizontal axis illustrates the similarity between their life environments. As illustrated in the drawing, the first judgment unit 152 judges that four sets of users (the carer B/the person to be cared for B', the carer C/the person to be cared for C', the carer D/the person to be cared for D', and the carer E/the person to be cared for E', hereinafter referred to respectively as the users B/B', C/C', D/D', and E/E') out of the users registered in the first information 107 are similar to the first user (the carer A/the person to be cared for A'). On the other hand, the second judgment unit 153 judges that the life environment CN1 of the user A/A' is similar to the life environment CN2 of the user B/B', the life environment CN3 of the user C/C', and the life environment CN5 of the user E/E', but is not similar to the life environment CN4 of the user D/D'.

In this case, the history check unit 154 refers to purchase histories HB, HC, and HE of the users B/B', C/C', and E/E' (may refer to a purchase history HA of the user A/A') which satisfy both the similarity between the carer and the person to be cared for and the similarity between their life environments, and then determines items whose advertisements are to be displayed based on these sets of information. At this time, it is preferable to display advertisements while prioritizing items many of similar users have purchased in the past. It is most preferable to display advertisements on an item all of the similar users have purchased, or alternatively, an item not all of but most of the similar users have purchased. Such items are given high priority in terms of display of advertisements.

Figure 7A:
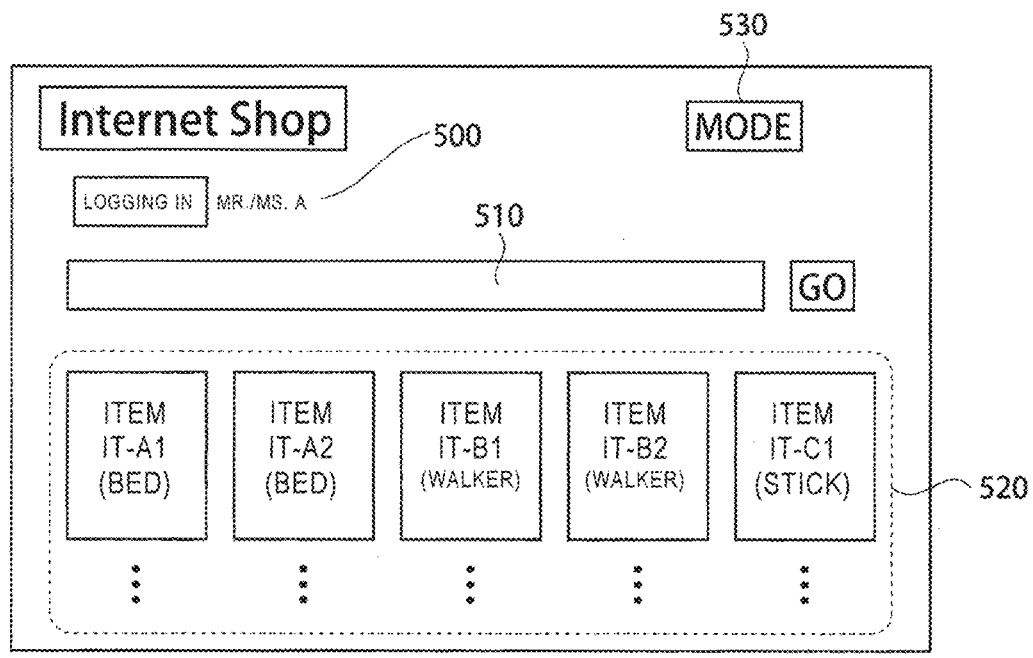
FIG. 7A is a conceptual diagram illustrating an example of a user terminal screen observed when the advertisement method according to the first embodiment is executed.
Figure 7B:
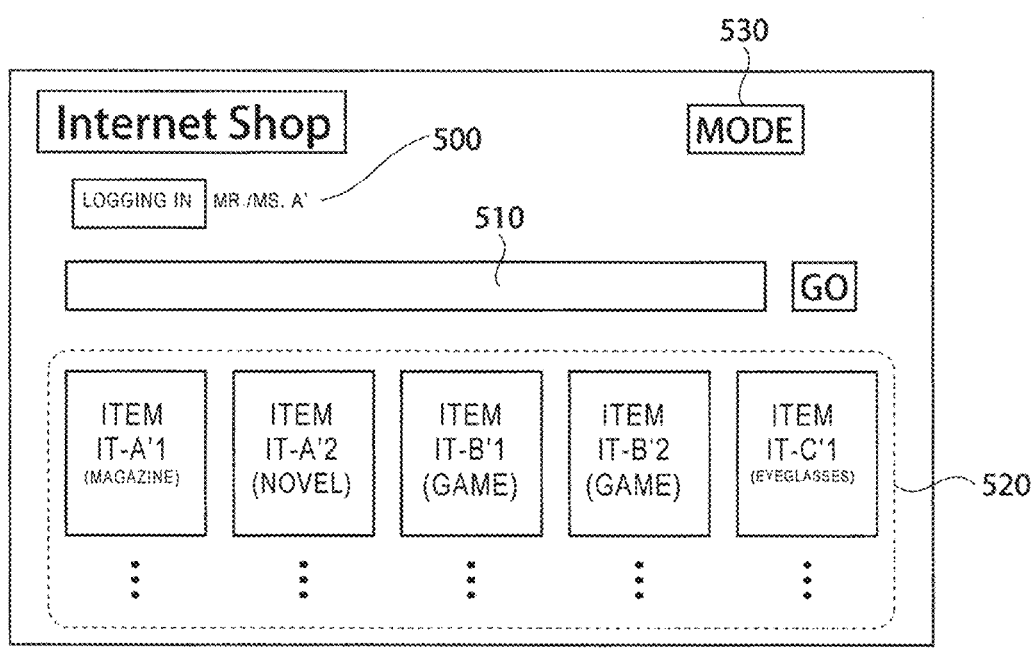
FIG. 7B is a conceptual diagram illustrating an example of the user terminal screen observed when the advertisement method according to the first embodiment is executed.

FIGS. 7A and 7B illustrate an example of display screens of the information terminals 20a and 20b of the first user on which item advertisements are displayed in the above manner. FIG. 7A illustrates a case in which the carer A logs in. When the carer A logs in, the history check unit 154 and the item advertisement unit 155 display items based on the purchase histories of the carers B, C, and E out of the similar users B/B', C/C', and E/E'. In the example of FIG. 7A, they display advertisements on items IT-A1 (e.g. bed) and IT-A2 (e.g. bed) based on the purchase history of the carer A himself/herself, items IT-B1 (e.g. walker) and IT-B2 (e.g. walker) based on the purchase history of the carer B, and an item IT-C1 (e.g. stick) based on the purchase history of the carer C.

FIG. 7B illustrates a case in which the person to be cared for A' logs in. When the person to be cared for A' logs in, the history check unit 154 and the item advertisement unit 155 display items based on the purchase histories of the persons to be cared for B', C', and E' out of the similar users B/B', C/C', and E/E'. In the example of FIG. 7B, these units display advertisements on items IT-A'1 (e.g. magazine) and IT-A' 2 (e.g. novel) based on the purchase history of the person to be cared for A' himself/herself, items IT-B'1 (e.g. game) and IT-B'2 (e.g. game) based on the purchase history of the person to be cared for B', and an item IT-C'1 (e.g. eyeglasses) based on the purchase history of the person to be cared for C'.

Figure 7C:
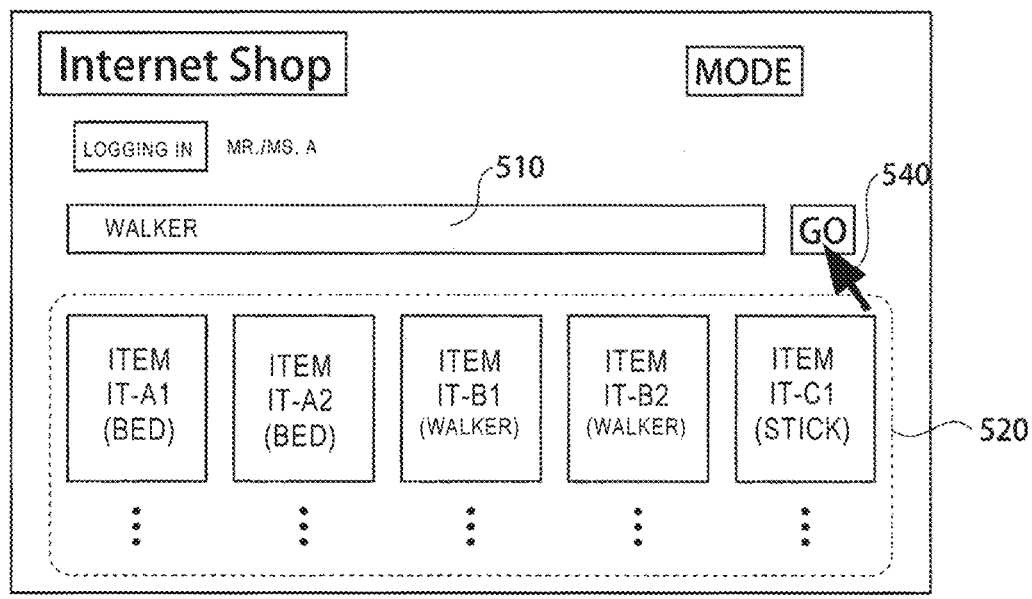
FIG. 7C is a conceptual diagram illustrating an example of the user terminal screen observed when the advertisement method according to the first embodiment is executed.
Figure 7D:
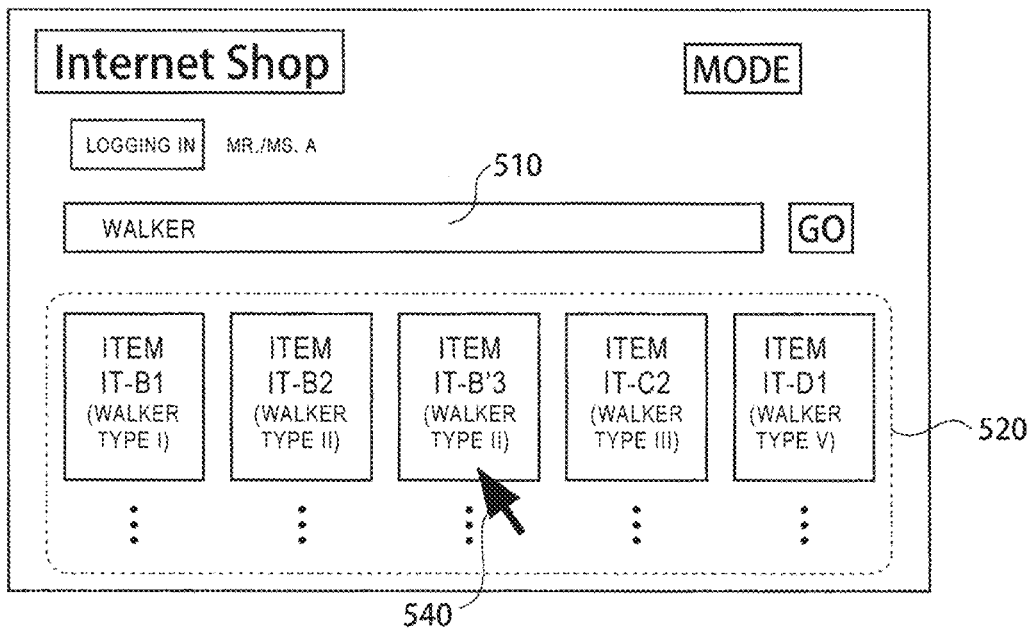
FIG. 7D is a conceptual diagram illustrating an example of the user terminal screen observed when the advertisement method according to the first embodiment is executed.

As illustrated in FIGS. 7A and 7B, on a login screen, a name 500 of the user logging in, an item search window 510, advertisements 520, and a mode change button 530 are displayed. As illustrated in FIG. 7C, once a search word from the first user is accepted in the search window 510 (Step S104, YES), the first item search unit 157 searches for an item based on the search word (Step S105). FIG. 7C illustrates an example in which the first user searches for a "walker". Then, the first item search unit 157 searches for walkers out of all of the items, and further narrows the walkers thus searched for down to walkers that satisfy the relationship of FIG. 6 (Step S106). Specifically, the first item search unit 157 narrows the walkers thus searched for down to items that have been purchased by users who are similar to the user in the relationship between the carer and the person to be cared for and in life environment. Then, the item advertisement unit 155 displays the items thus obtained by the first item search unit 157 (Step S107). FIG. 7D illustrates how this process goes. As illustrated in the drawing, all of the item advertisements 520 are related to walkers. These are the items IT-B1 and IT-B2 purchased by the carer B, an item IT-B'3 purchased by the person to be cared for B', an item IT-C2 purchased by the carer C, and an item IT-D1 purchased by the carer D. Here, all of these items are walkers, but their detailed types are different from each other. Such difference is indicated by the description "type I", "type II", "type III", and "type V" attached to the items. Specifically, there are various walkers such as a four-legged walker, a fixed walker, an alternating walker, a walker with caster, and a walker with motor. In this way, a more detailed categorization of items in the same category is hereinafter referred to as a "type".

Assume a case in which the first user selects the item IT-B'3, for example (Step S108, YES). Then, the item advertisement unit 155 displays the details of the item IT-B'3, for example (Step S109). This is a type II walker. Then, in a case in which the first user purchases this type II walker, the purchase accepting unit 156 processes this purchase request.

Thereafter, when accepting a command to go back to the previous screen in response to the first user's pressing of the browser's "Back" button, for example (Step S110, YES), the item advertisement unit 155 displays advertisements on the items obtained in Step S106 (Step S112) if the first mode is selected (Step S111, YES). In other words, the different types of walkers are displayed as illustrated in FIG. 7D.

Figure 7E:
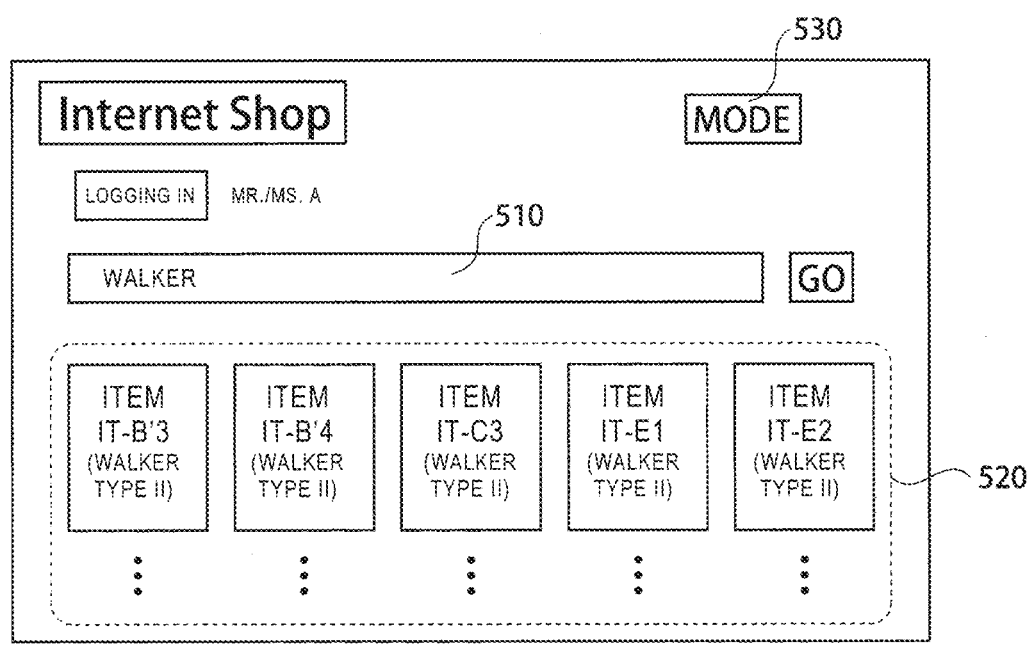
FIG. 7E is a conceptual diagram illustrating an example of the user terminal screen observed when the advertisement method according to the first embodiment is executed.

On the other hand, if the first mode is not selected (such a mode is referred to as a second mode, Step S111, NO), the mode controller 158 activates the second item search unit 159. Then, the second item search unit 159 narrows the result of the search, executed by the first item search unit 157 in Step S106, down to items similar to the item selected by the first user in Step S108 (Step S113). In other words, the second item search unit selects, out of the items in the same category, items similar to the item selected in Step S108. Such a similarity between the items in this example is the "type" described above. Specifically, the type II walker has been selected in Step S108. Accordingly, the second item search unit 129 selects type II walkers out of the search result in Step S106. Then, the item advertisement unit 155 displays advertisements on the type II walkers thus obtained by the second item search unit 159 (Step S114). FIG. 7E illustrates how this process goes.

The switching between the first mode and the second mode is executed by the user's selection of the mode change button 530, for example. By accepting selection of the mode change button 530, the mode controller 158 activates or inactivates the second item search unit.

1.3 Effect According to this Embodiment

According to this embodiment, it is possible to provide an information processor and an information processing method capable of proposing more useful items to a user. Hereinbelow, this effect is described in detail.

In modern society, various items are traded using the Internet. Thus, in terms of the method of purchasing nursing care items etc., purchasing on a website using the Internet is expected to become a mainstream instead of purchasing in areal shop. For this reason, for dealers of nursing care items etc., how much efficient advertisements they can provide to a user is important.

Hence, in the advertisement providing system according to this embodiment, the following two similarities are first judged.

Similarity in terms of the relationship between the carer and the person to be cared for Similarity in terms of the life environment of the carer and/or the person to be cared for Specifically, if the relationship between the carer and the person to be cared for is similar, it is highly possible that they feel like buying similar items due to this similarity. In addition, if their life environments are also similar, this possibility becomes higher. In other words, it is possible to reduce display of unnecessary advertisements as much as possible and thus provide effective advertisements.

Items requested in the nursing care field are based on various complex factors, and these factors are generally different from factors based on which typical hobby items are selected. For example, the relationship between the carer and the person to be cared for is conceivable as one of such factors. As described previously, the relationship between the carer and the person to be cared for is likely to have a large influence especially on how much burden the carer bears in the nursing care work. In addition, the life environments of the carer and the person to be cared for are also conceivable as another one of the above factors. This is because their lifestyles are likely to directly affect the burden the carer bears.

Accordingly, in this embodiment, users who are similar in terms of the relationship between the carer and the person to be cared for and similar in terms of life environment are searched. This is because the users having both of these two similarities are conceivably similar in terms of how much burden the carer bears and the type of the nursing care contents requested, and therefore one of the users is conceivably in need of an item similar to that needed by the other user. In this embodiment, an item similarity can also be taken into consideration in addition to the above two similarities.

As has been described above, according to this embodiment, items to be advertised are selected based on the similarity in terms of the relationship between the carer and the person to be cared for, the similarity in terms of the life environments of the carer and/or the person to be cared for, and the item similarity. As a result, it is possible to advertise more useful items to the user.

Note that, although this embodiment has been described with the advertisement method for users having purchased a nursing care bed taken as an example, this is merely an example and the same goes for users having purchased other items. For example, the same method can be used to determine advertisement items for users and the like having purchased a wheelchair with the application of a nursing care insurance. In a case in which sensors are mounted on the wheelchair and the user also uses a nursing care bed, the second information 108 may be created based on data given by both the sensors of the wheelchair and the sensors of the bed.

In addition, although the above embodiment has been described with the example in which, in the processing described in Steps S111 to S114, a large category "walker" is provided, and the second item search unit 159 narrows down items in this large category according to a small category "type" of the walker, the way of categorization is not limited to this as long as it narrows items in a large category down to items in a small category. For example, if the user searches for a "walker with caster" first instead of a simple "walker" and selects one of items thus searched for, the second item search unit 159 searches walkers with caster for walkers with caster of the same type as the walker with caster selected by the user. Alternatively, if the user adversely searches for a "nursing care item" first instead of a "walker" and selects a "walker" out of items thus searched for, the second item search unit 159 searches for walkers of multiple types (such as a four-legged walker, a fixed walker, an alternating walker, a walker with caster, and a walker with motor). Alternatively, if the user searches for a "walker with caster" first and selects an item made by a certain maker, the second item search unit 159 may search walkers with caster for walkers with caster made by this maker.

2. Second Embodiment

Next, an information processor according to a second embodiment is described. This embodiment relates to a method for the server 10 to accumulate the nursing care contents that the person to be cared for has requested to the carer using the information terminal in the first embodiment above and thereby judge the situation of the person to be cared for. Hereinbelow, a description is given only of points different from the first embodiment.

2.1 About Configuration of Information Terminal 20*b*

Figure 8:
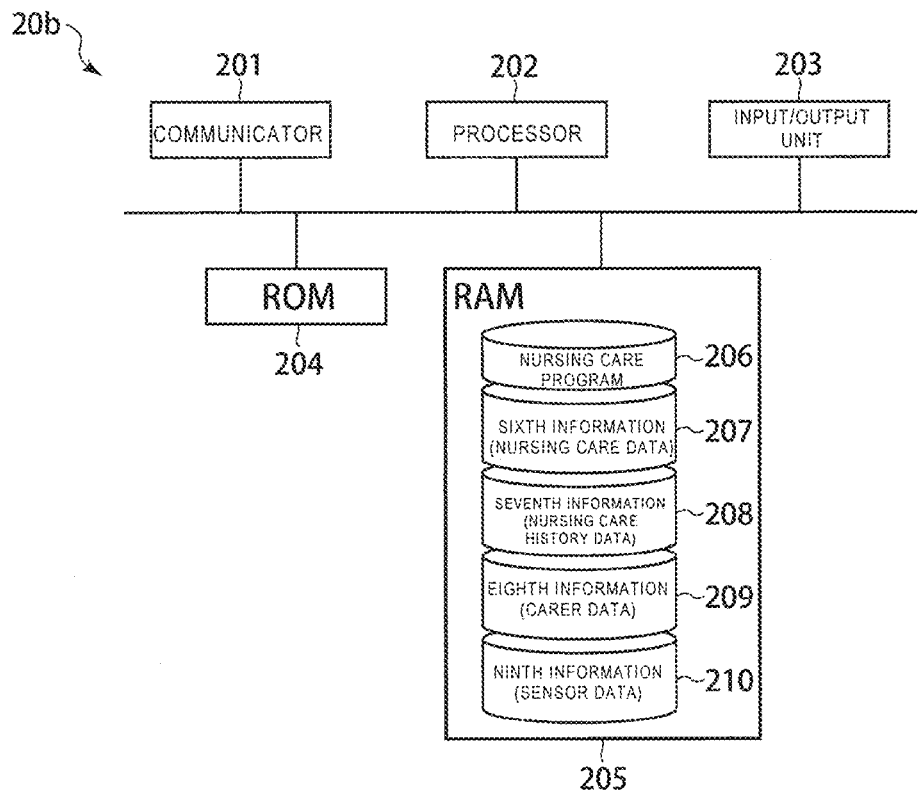
FIG. 8 is a block diagram of an information terminal according to a second embodiment.

FIG. 8 is a block diagram illustrating an example of a hardware configuration of the information terminal 20*b* held by the person to be cared for. As illustrated in the drawing, the information terminal 20*b* includes: a communicator 201; a processor 202; an input/output unit 203; a ROM 204; and a RAM 205.

The communicator 201 is configured to transmit and receive information to and from the network 2 by wireless or wired communication. The input/output unit 203 is configured to accept commands from the person to be cared for, and display results of processing by the processor 202, for example. The memory (such as a ROM) 204 is configured to hold programs (such as an operating system) to be executed by the processor 202 and necessary data. The memory (such as a RAM) 205 functions as a work area of the processor 202. The RAM 205 is configured to hold various programs and data. The processor 202 is configured to operate and provide effective advertisements to the user by executing the programs inside the ROM 204 and the RAM 205.

The programs and data held by the above RAM 205 are described below. As illustrated in FIG. 8, the RAM 205 holds a nursing care program 206, and sixth information 207 to ninth information 210.

First, the sixth information 207 is described. The sixth information is data on nursing care. Specifically, the sixth information includes the nursing care contents that the person to be cared for can request to the carer. Examples of the nursing care contents include: physical assistance such as bathing assistance, wheelchair transfer assistance, excretion assistance, postural change assistance, change of clothes assistance, and walking support; living support such as meal preparation, cleaning/washing/taking garbage outside, shopping of commodities etc. instead, and cleanup of rooms; and assistance in getting on/off a vehicle at the time of going to the hospital.

The seventh information 208 is data on the history of the nursing care contents requested by the person to be cared for. In addition to the nursing care contents, the seventh information 208 may also include the date and time when the nursing care was requested and sensor data at the time of the nursing care.

The eighth information 209 is data on the carer who cares for the person to be cared for, and includes information on the name and email address of the carer, for example. In addition, when there are multiple carers, for example, the eighth information includes information on these multiple carers and the person to be cared for can select the carer to whom he/she requests the nursing care.

The ninth information 210 is sensor data. The information terminal 20b is configured to receive and hold sensor data continuously or discretely, for example. The ninth information 210 may hold only data acquired for a given period before and after the timing when the person to be cared for requests the nursing care, for example.

The nursing care program 206 is executed by the processor 202 to cause the processor 202 to run a nursing care application on the user's information terminal 20b using the sixth information 207 to ninth information 210. Using this application, the person to be cared for can request nursing care to the carer.

Figure 9:
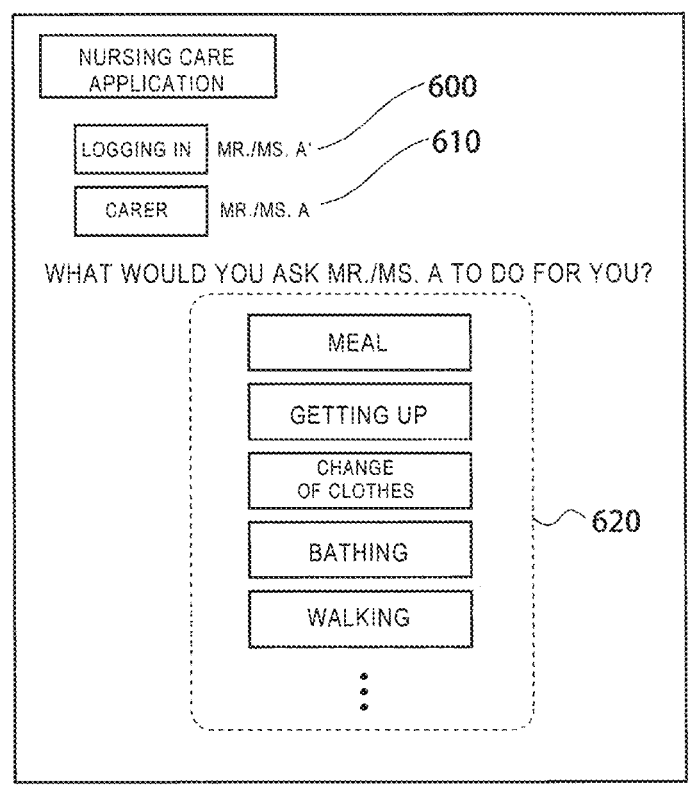
FIG. 9 is a conceptual diagram illustrating an example of a user terminal screen observed when an advertisement method according to the second embodiment is executed.

FIG. 9 illustrates an example of a display screen of the information terminal 20b of the person to be cared for observed when the nursing care application is run by the processor 202. As illustrated in the drawing, the name of the person to be cared for A' is displayed as a login name 600, and the name of the carer A is displayed as information 610 on the carer of the person to be cared for A'. The list of nursing care contents to be requested to the carer A is displayed, and once the person to be cared for A' selects one of the nursing care contents, the contents thus selected is sent to the carer A and the server 10.

Figure 10:
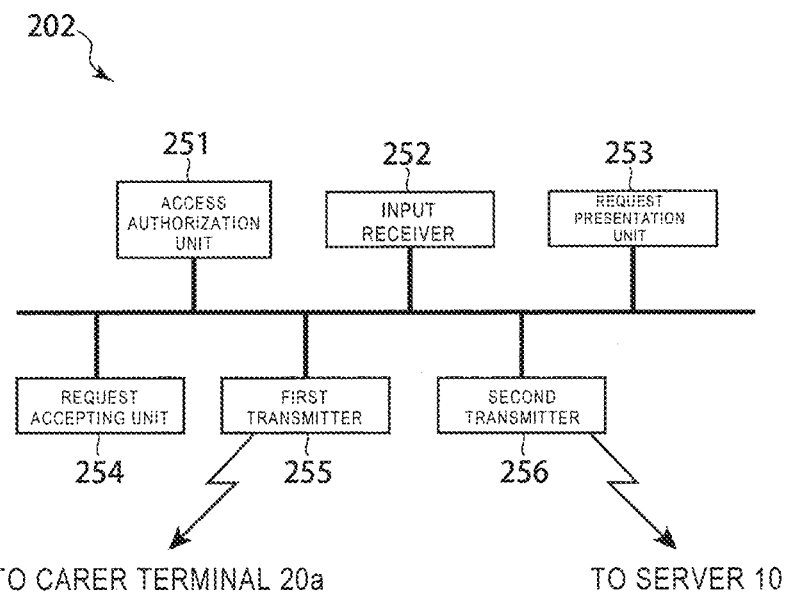
FIG. 10 is a functional block diagram of a processor of the information terminal according to the second embodiment.

FIG. 10 is a functional block diagram of the processor 202 at the time of executing the nursing care program 206. As illustrated in the drawing, by executing the nursing care program 206, the processor 202 functions as an access authorization unit 251, an input receiver 252, a request presenting unit 253, a request accepting unit 254, a first transmitter 255, and a second transmitter 256.

The access authorization unit 251 is configured to control user's access to the website of the advertisement providing system according to this embodiment. In other words, the access authorization unit 251 is configured to authenticate user's identity using a password and ID etc. authentication system, and authorize or prohibit user's access to the website. Needless to say, the access authorization unit 151 of the server 10 described in FIG. 4 may execute this function.

The input receiver 252 is configured to accept various information inputs from the user and signals from the sensors. The request presenting unit 253 is configured to display, on a display, the nursing care menu that the carer can offer based on the sixth information (nursing care data) 206. The request accepting unit 254 is configured to accept selection of the nursing care menu, presented by the request presenting unit 253, by the person to be cared for. The first transmitter 255 is configured to send, when the request accepting unit 254 accepts selection by the person to be cared for, the fact that the selection has been accepted and the nursing care contents thus selected, for example, to the information terminal 20a of the carer (the carer A in the example of FIG. 9) being selected. The second transmitter 256 is configured to send, when the request accepting unit 254 accepts selection by the person to be cared for, the fact that the selection has been accepted and the nursing care contents thus selected to the server 10. In this event, the second transmitter 256 may send the server 10 sensor's measurement data measured for a given period before and after the time point when the selection by the person to be cared for is accepted.

2.2 About Configuration of Server 10

Figure 11:
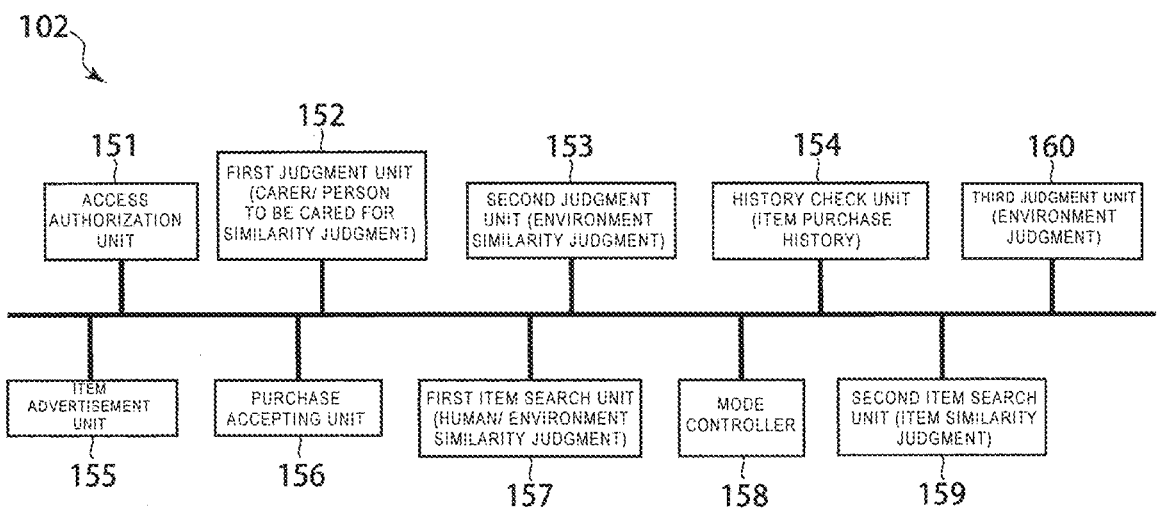
FIG. 11 is a functional block diagram of a processor of a server according to the second embodiment.

FIG. 11 is a functional block diagram of the processor 102 of the server 10 according to this embodiment. As illustrated in the drawing, by executing the advertisement program 106, the processor 102 can function as a third judgment unit 160 in addition to the functions described in the first embodiment using FIG. 4.

Data on the nursing care contents acquired from the information terminal 20b is held in the server 10 as a type of the first information (input data) 107, for example, and sensor data at this time is held as the second information 108. The third judgment unit 160 is configured to analyze the life environment of the person to be cared for based on the data on the nursing care contents acquired from the information terminal 20b (and the sensor data). This analysis result is held as the third information (environment data) 109.

2.3 Operation

Figure 12:
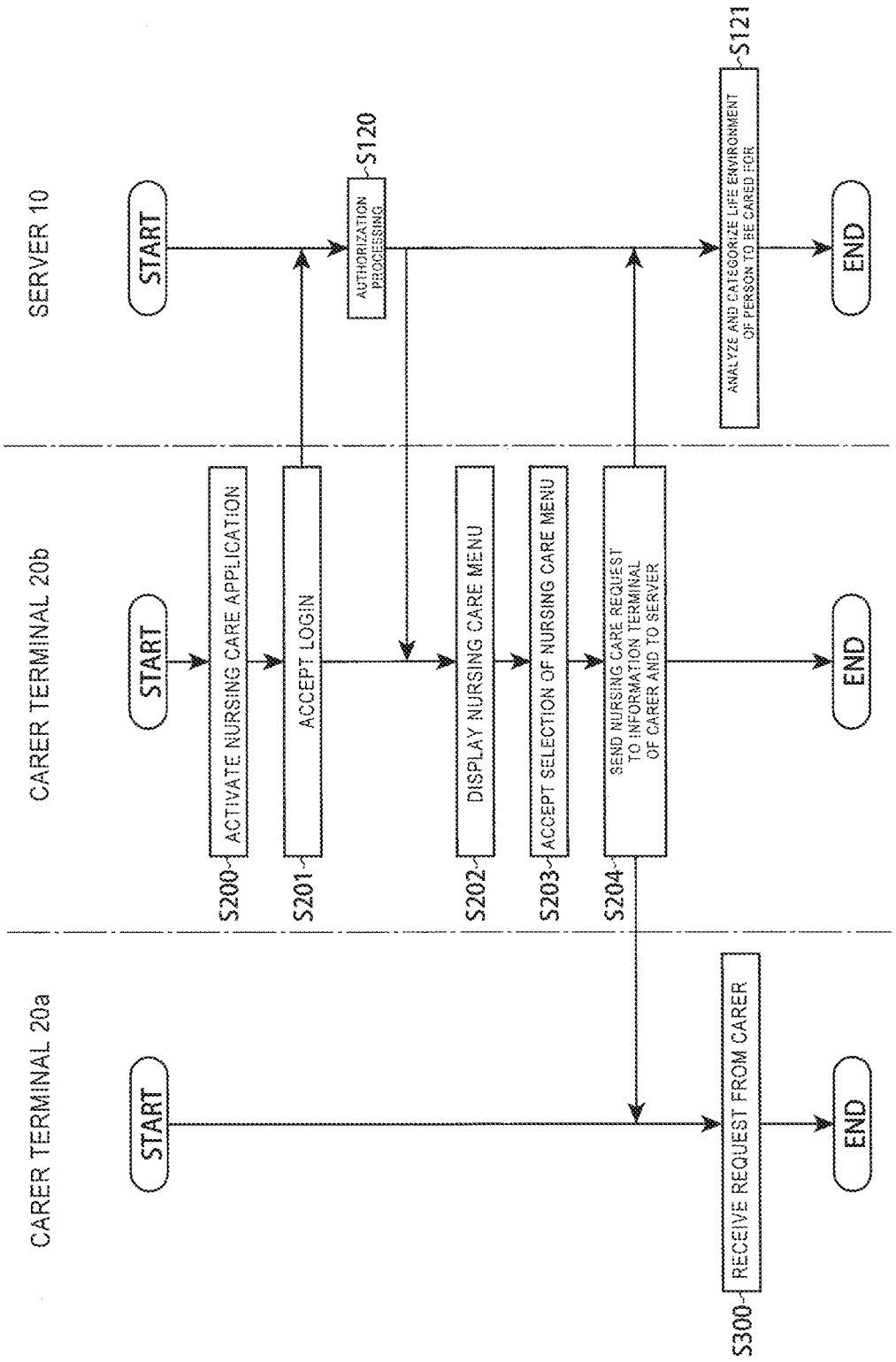
FIG. 12 is a flowchart illustrating an operation of the server and the information terminal according to the second embodiment.

Next, the operation of the advertisement providing system according to this embodiment is described while particularly focusing on the operation of the information terminal 20b of the person to be cared for. FIG. 12 is a flowchart illustrating the operations of the information terminal 20a of the carer, the information terminal 20b of the person to be cared for, and the server 10, and the processes in this drawing are executed mainly by the processors 102 and 202.

As illustrated in the drawing, the information terminal 20b first executes the nursing care program 206 to activate the nursing care application according to a request from the person to be cared for (Step S200). Subsequently, the access authorization unit 251 of the information terminal 20b accepts login by the person to be cared for (Step S201), and executes authentication processing with the access authorization unit 151 of the server 10 (Step S120).

If the authentication processing is successful, the request presenting unit 253 of the information terminal 20b displays the nursing care menu on the display (Step S202). Before this processing, the information terminal 20b may accept selection of the carer by the person to be cared for. As a result of Step S202, the screen illustrated in FIG. 9 is displayed on the display of the information terminal 20b.

Subsequently, the request accepting unit 254 of the information terminal 20b accepts selection of any of the nursing care menu by the person to be cared for (Step S203). Then, the first transmitter 255 and the second transmitter 256 send the information terminal 20a and the server 10 information (and sensor data) on the nursing care request by the person to be cared for.

In the server 10, the third judgment unit 160 analyzes and categorizes the life environment of the person to be cared for according to the information thus received (Step S121). Meanwhile, upon receipt of the request from the person to be cared for (Step S300), the information terminal 20a notifies the carer of this request. Thereby, the carer recognizes the nursing care requested by the person to be cared for, and provides this service to the person to be cared for.

2.4 Effect According to this Embodiment

According to the configuration of this embodiment, the person to be cared for can notify, using the application, the carer of the nursing care contents that he/she would like the carer to provide.

Specifically, even when the carer and the person to be cared for live together or when the person to be cared for lives in a nursing care facility, it is difficult for the carer to keep a close watch on the person to be cared for 24 hours every day. For example, even when they live together, it is hard for the carer to see the condition of the person to be cared for while the carer prepares a meal or cleans rooms.

To deal with this, according to this embodiment, the person to be cared for can ask the carer to provide the nursing care using an information terminal such as a smartphone. Thanks to this, the carer no longer needs to stay close to the person to be cared for all the time, which makes it possible to enhance the quality of life of both the carer and the person to be cared for.

Further, according to this embodiment, the use of the nursing care application makes it possible to collect, to the server 10, the situation of nursing care that the person to be cared for requests in everyday life. More specifically, the server collects the contents of nursing care needed by the person to be cared for, a frequency by which and a time slot in which the nursing care is needed, and the like. This enables the server 10 to know especially what kind of nursing care the person to be cared for needs.

In addition, by using information from the sensors mounted on the bed 30 in combination, the server 10 can know the nursing care situation in more detail. For example, assume a case in which the person to be cared for frequently selects the "MEAL" button in the nursing care application. In this case, the server can anticipate that this person to be cared for finds it almost difficult to take a meal by himself/herself, or finds it difficult to walk by himself/herself to prepare a meal. Further, in a case in which the sensors send the server 10 data, indicating that the person to be cared for is on a bed, during a time slot in which the person to be cared for is presumed to be taking a meal, the server can know that the person to be cared for is taking a meal not at a table in a living room but on a bed. Further, in a case in which the server knows from the data of the sensors that the person to be cared for is on the bed with its backrest part raised and that a large pressure is applied on this backrest part, it is anticipated that the person to be cared for is taking a meal with his/her entire body leaning on the bed. In other words, the server can presume that the person to be cared for is unable to convey food to his/her mouth by himself/herself and thus unable to take a meal without assistance by the carer. On the other hand, in a case in which little pressure is applied on the backrest part, it is anticipated that the person to be cared for is taking a meal with his/her upper body raised. In this case, the person to be cared for might be able to take a meal without assistance by the carer.

Assume another example in which the sensors mounted on the bed 30 indicate that the person to be cared for frequently moves away from the bed, for example. However, with this information only, it might be difficult to know the living situation of the person to be cared for. In this regard, according to this embodiment, if the person to be cared for selects the "WALKING" button in the nursing care application at the timing of moving away from the bed, the server can know that the person to be cared for has moved away from the bed for walking. In addition, assume a case in which, at this moment, the person to be cared for has purchased a wheelchair and sensors are mounted also on this wheelchair. The sensors of the wheelchair send the server 10 information on when and how long the wheelchair has been used and how far the wheelchair has moved, for example. Then, by analyzing the data from the sensors of the wheelchair together, the server 10 can judge whether the person to be cared for takes a walk by using the wheelchair most of the time or by walking by himself/herself. Such processing is executed by the third judgment unit 160 of the server 10, for example.

As has been described above, by using the nursing care application according to this embodiment, the server 10 can accumulate information unable to be acquired through the sensors alone. Thereby, the server can provide more effective advertisements to the carer and the person to be cared for.

3. Third Embodiment

Next, an information processor according to a third embodiment is described. In the first and second embodiments above, the description has been given of the case of providing advertisements to the user (the carer A or the person to be cared for A') having purchased or rented the nursing care bed in the past. This embodiment relates to the process of purchasing and renting the nursing care bed in the above first and second embodiments including application for a nursing care insurance.

3.1 About Configuration of Server 10

Figure 13:
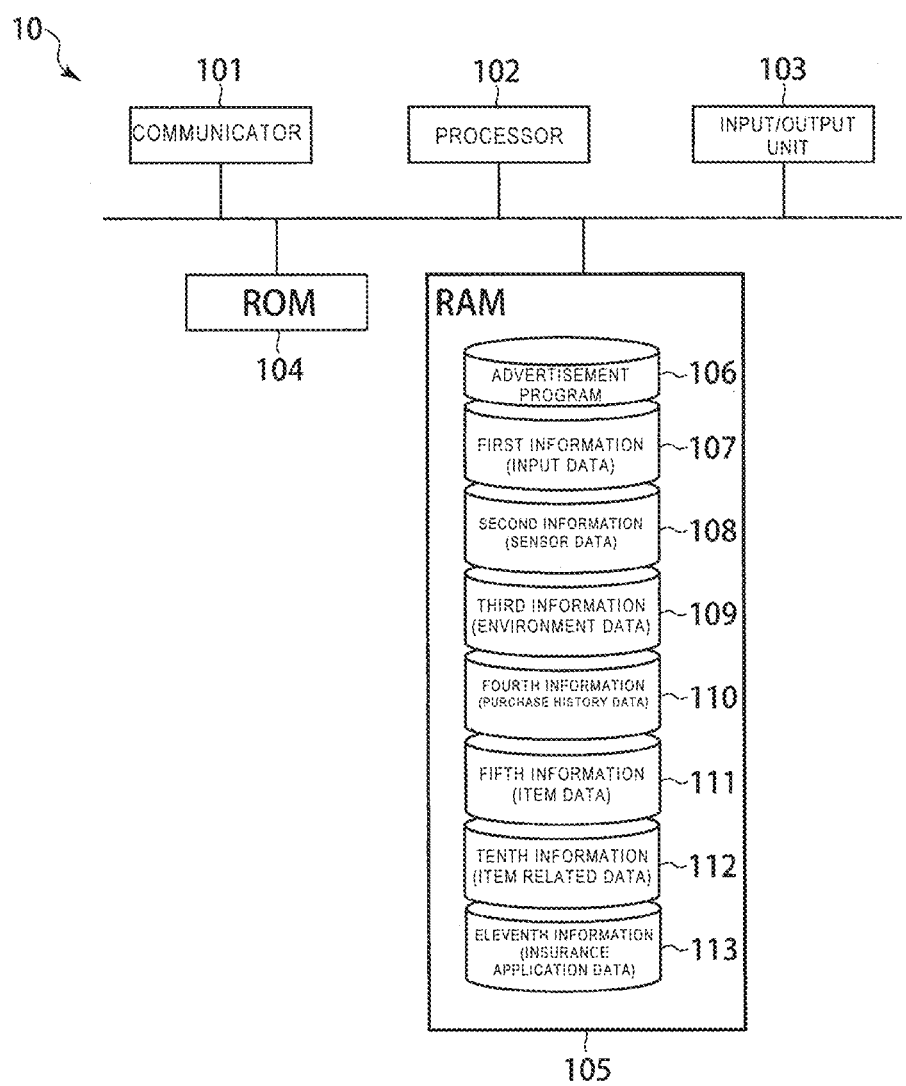
FIG. 13 is a block diagram of a server according to a third embodiment.

FIG. 13 is a block diagram illustrating an example of the hardware configuration of the server 10 according to this embodiment. As illustrated in the drawing, in the configuration of FIG. 2 illustrated in the first embodiment, the RAM 105 of the server 10 further holds tenth information 112 and eleventh information 113, for example. In addition, the advertisement program. 106 according to this embodiment has a function of accepting item selling and renting requests in addition to the function of displaying advertisements as described in the first and second embodiments. Needless to say, programs for controlling item selling and renting processing may be prepared separately in addition to the advertisement program 106 for displaying advertisements.

The tenth information 112 holds item related data. In a case in which the user intends to purchase or rent the nursing care bed for example, the item related data indicates information on sensors and the like suitable or recommended for the bed and on other items, such as a wheelchair, suitable for use with the bed. Alternatively, as is to be described in detail later, the item related data indicates information on sensors and the like suitable or recommended for acquiring data believed to be needed when applying for a nursing care insurance. In other words, the tenth information 112 is information indicating the relationship between a certain item and other items recommended for use with this item.

The eleventh information 113 holds data on application for a nursing care insurance. For example, the eleventh information 113 holds information needed to apply for a nursing care insurance and format data for accepting such information from the user. A specific example thereof is to be described later.

Figure 14:
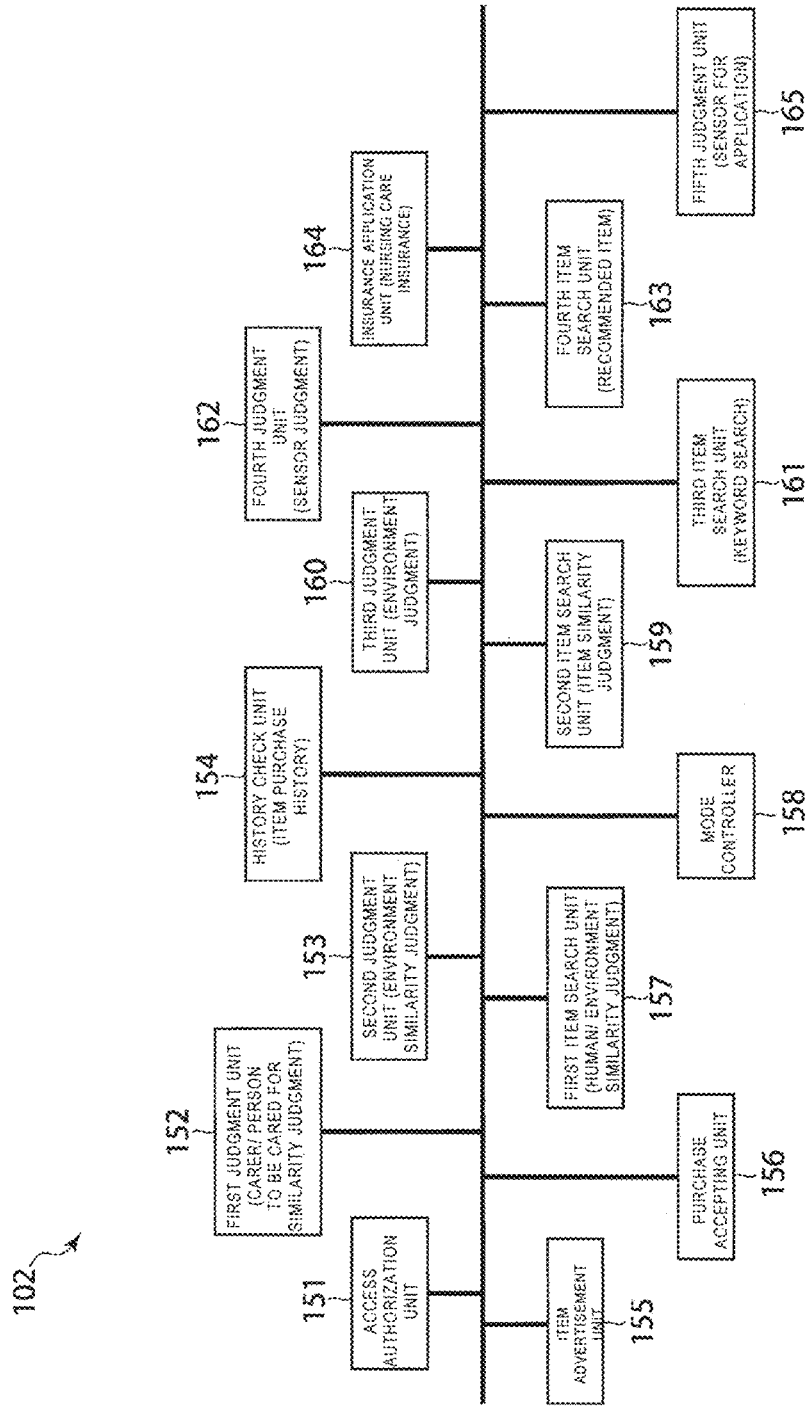
FIG. 14 is a functional block diagram of a processor of the server according to the third embodiment.

The advertisement program 106 is configured to accept the user's item search and accept item purchasing and renting commands from the user in addition to the display of advertisements illustrated in FIG. 5 in the first embodiment. FIG. 14 is a functional block diagram of the processor 102 at the time of executing the advertisement program 106 according to this embodiment. As illustrated in the drawing, the processor 102 functions as a third item search unit 161, a fourth judgment unit 162, a fourth item search unit 163, an insurance application unit 164, and a fifth judgment unit 165 in addition to the functions of FIG. 11 illustrated in the second embodiment.

The third item search unit 161 is configured to search for target items from the fifth information (item data), for example, based on a search word accepted from the user. The fourth judgment unit 162 is configured to refer to sensor's image data, for example, received from the user and identify the type (such as the model number) of the sensor. Needless to say, the sensor mentioned here is merely an example, and the fourth judgment unit 162 can also identify other items (such as a wheelchair, a stick, and other items). The fourth item search unit 163 is configured to search for items based on the result thus identified by the fourth judgment unit 162. For example, when the fourth judgment unit identifies a sensor upon receipt of a certain search word from the user, the fourth item search unit 163 searches a group of items, associated with the search word, for items suitable for the sensor thus identified or recommended for use with the sensor. The insurance application unit 164 is configured to prompt the user to input information necessary for application for a nursing care insurance. At this time, the insurance application unit 164 may accept input of information on the relationship between the carer and the person to be cared for and their life environments illustrated in the first embodiment. The insurance application unit 164 may also create a nursing care insurance application document based on the accepted information and apply for a nursing care insurance through the Internet, for example. The fifth judgment unit 165 is configured to judge (search for), if the information necessary for application for a nursing care insurance is not all set, whether or not there is an item (mainly a sensor, for example) necessary for acquiring such information in the item data in the fifth information 111.

3.2 Operation

Figure 15:
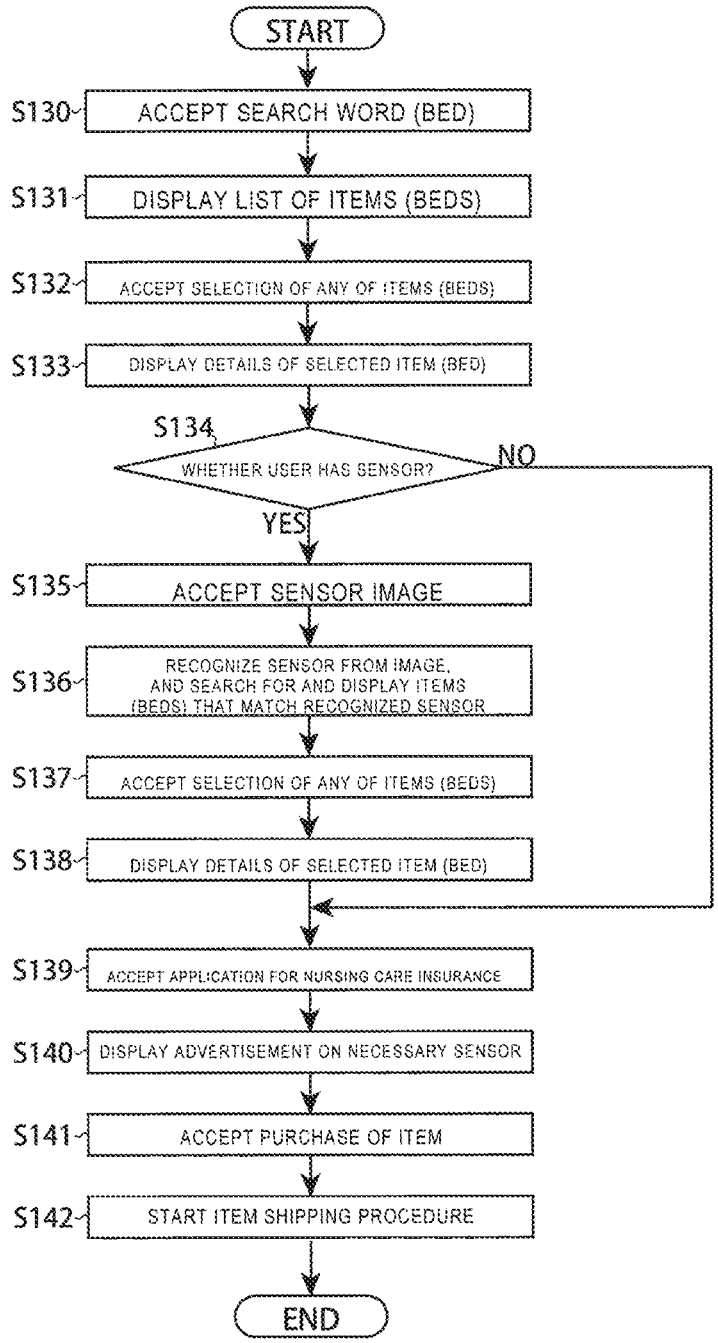
FIG. 15 is a flowchart illustrating an operation of the server according to the third embodiment.

Next, the operation of the advertisement providing system according to this embodiment is described while particularly focusing on the operation of the server 10. FIG. 15 is a flowchart illustrating the operation of the server 10, in which each process is executed mainly by the processor 102. In this example, a description is provided with an example in which the first user (the carer A and the person to be cared for A') illustrated in the first embodiment applies for application of a nursing care insurance system and rents a nursing care bed through the website of this advertisement providing system.

Figure 16A:
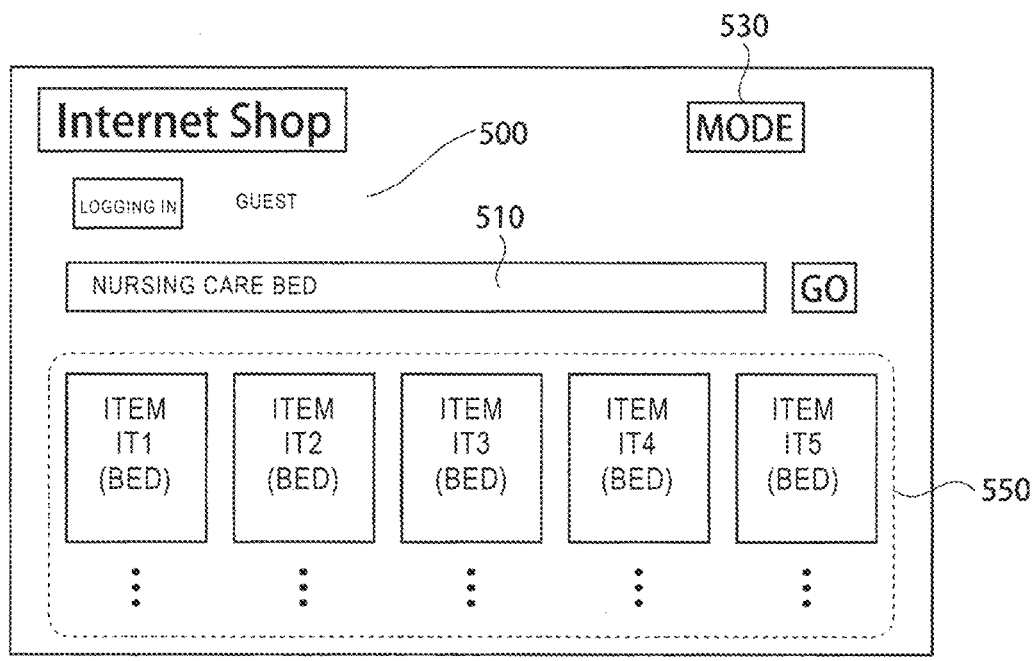
FIG. 16A is a conceptual diagram illustrating an example of a user terminal screen observed when an advertisement method according to the third embodiment is executed.

As illustrated in the drawing, the server 10 accepts a search word ("nursing care bed" in this example) from the user through the website of this advertisement providing system (Step S130). Then, the third item search unit 161 searches the item data in the fifth information 111 based on the search word, and displays a list of items that matches the search word on the information terminal 20a and/or information terminal 20b of the first user. FIG. 16A illustrates how this process goes. As illustrated in the drawing, once "nursing care bed" is input in the item search window 510, the third item search unit 161 searches for target items and displays items IT1 to IT5 thus searched for. All of the items displayed may be nursing care beds, or alternatively normal beds may be included in addition to nursing care beds. In this case, nursing care beds are preferentially displayed.

Figure 16B:
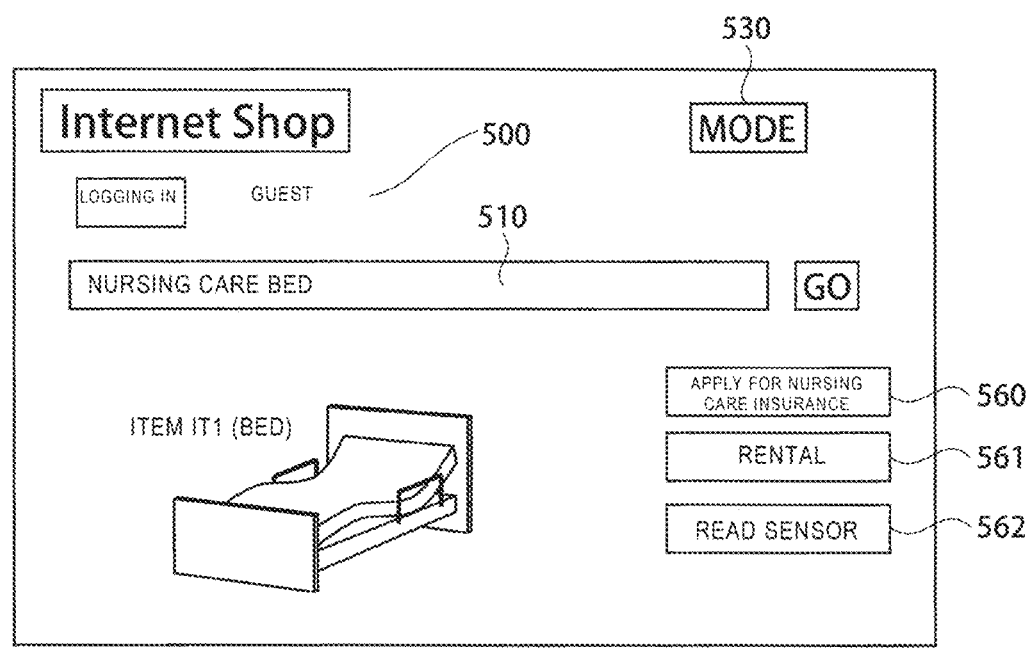
FIG. 16B is a conceptual diagram illustrating an example of the user terminal screen observed when the advertisement method according to the third embodiment is executed.

Then, when the first user selects any of these items (Step S132), the third item search unit 161 displays the details of the selected item on the information terminal 20a and/or information terminal 20b of the first user (Step S133), for example. FIG. 16B illustrates how this process goes. The example of FIG. 16B illustrates the screen observed when the item IT1 (nursing care bed) is selected. At the time of displaying the details of the item, a nursing care insurance application button 560, a rental button 561, and a sensor read button 562 are displayed.

If the first user already has a sensor that is usable in the nursing care bed (Step S134, YES), the first user selects the "READ SENSOR" button 562. Thereby, the first user can send the server 10 image data of the sensor that the user already has. The server 10 receives this image data through the communicator 101 (Step S135), the fourth judgment unit 162 identifies this sensor, and the fourth item search unit 163 searches for and displays items (nursing care beds) that match the identified sensor (Step S136). Then, the first user selects any of these items (Steps S137, S138).

Subsequently, the first user selects the "APPLY FOR NURSING CARE INSURANCE" button 560 (Step S139) in the screen illustrated in FIG. 16B. Then, the insurance application unit 164 prompts the first user to input information necessary to apply fora nursing care insurance. For example, the insurance application unit 164 displays a screen illustrated in FIG. 16C to ask for input of necessary data. In FIG. 16C, for example, in addition to the height and weight of the person to be cared for A', the insurance application unit asks for input of information on whether he/she can roll over in bed, whether he/she can get up in bed, whether he/she can walk inside, or on other nursing care service and welfare equipment being used, for example. However, the example of FIG. 16C is merely an example, and the insurance application unit 164 can ask for input of various kinds of data. Further, in this step, the insurance application unit 164 may ask for input of information on the carer A in addition to the information on the person to be cared for A'. Thereby, the server 10 acquires the first information 107 illustrated in the first embodiment, and thus can recognize the relationship between the carer A and the person to be cared for A'. In addition, based on this input information, the server 10 possibly acquires a part of information on the life environments of the carer and the person to be cared for.

After accepting the information for applying for a nursing care insurance, the fifth judgment unit 165 judges whether or not information for receiving a nursing care insurance can be achieved using only sensors owned by the first user. Then, if judging that an additional sensor is needed, the fifth judgment unit 165 searches for a sensor needed and displays its advertisements on the information terminal 20a and/or information terminal 20b of the first user (Step S140). FIG. 16D illustrates how this process goes. In FIG. 16D, advertisements 563 on items IT-S1 to IT-S3 (all of which are sensors) are displayed in the screen of FIG. 16B described previously. This prompts the first user to purchase another sensor needed for the nursing care insurance to be approved.

Then, when the first user selects the "RENTAL" button 561, the purchase accepting unit 156 accepts rental (or purchase) of the selected item (Step S141). The user typically rents an item such as a nursing care bed rather than purchasing it. Thus, the following embodiments are also described with the example of renting a nursing care bed, but the same goes for the case of purchasing a nursing care bed.

Then, the server 10 starts a procedure of shipping the selected nursing care bed and sensor to the first user.

3.3 Effect According to this Embodiment

According to this embodiment, it is also possible to provide an information processor and an information processing method capable of proposing more useful items to a user.

Specifically, according to this embodiment, when the user already has a sensor, advertisements on items suitable for this sensor are displayed. Thereby, the user can purchase a new item without wasting the sensor already purchased. In addition, as illustrated in FIG. 16D, after deciding an item to be purchased, advertisements on related items, such as a sensor, needed or recommended for use for the application of the nursing care insurance system are displayed. This saves the user's trouble of looking for a sensor needed, which improves the user's convenience.

Further, according to this embodiment, the server 10 accepts application for a nursing care insurance, and the server 10 applies for a nursing care insurance after necessary information is collected. Further, if necessary, the server 10 can contact a care manager instead of the user. In some cases, the AI function of the server 10 can provide the service of the care manager instead. In this way, the user does not need to perform cumbersome nursing care insurance application procedures, which improves the user's convenience.

Note that, the above embodiment is described with the example of displaying advertisements on sensors necessary for application for a nursing care insurance in Step S140. However, irrespective of a nursing care insurance, the fifth judgment unit 165 may search for and display advertisements on other items suitable for the item that the user has decided to purchase (a nursing care bed in the above example). For example, such items may be a wheelchair, a bedsore prevention tool, a walker, and an excretion processor.

For example, in a case in which the user having purchased a nursing care bed purchases a wheelchair, the user searches for a wheelchair and the server 10 displays a list of wheelchairs in Step S131. Then, the server 10 receives image data of a nursing care bed being used by the user in Step S135, and identifies the type, the model number, and the like of this nursing care bed in Step S136. Further, in Step S136, the server 10 searches for a wheelchair easily usable with the nursing care bed that the user is using. Specifically, there are various nursing care beds, and so are wheelchairs. Depending on a combination of these two items, the user might find it difficult to move from the bed to the wheelchair, or adversely, might find it difficult to move from the wheelchair to the bed, for example. Further, a combination of the nursing care bed and the wheelchair originally designed to be used together is also possible. The server 10 holds these information as the tenth information 112 (item related data), and thus can recommend an appropriate wheelchair to the user based on the information. In addition, in a case in which the user purchases a wheelchair, the server 10 may display advertisements on sensors installable in the wheelchair.

Note that, the above embodiment is described with the example of accepting the sensor image when the user selects any of the items (Steps S132, S133). However, it is also possible to execute Step S135 before accepting selection from the user in Step S132, for example. Specifically, by sending image data to the server 10 after the server displays a list of beds in Step S131, the server may narrow beds to be displayed down to beds suitable for the sensor. In addition, the processing order can be switched in every possible way.

4. Fourth Embodiment

Next, an information processor according to a fourth embodiment is described. In ordinary cases, when the user purchases or rents a large-size nursing care item such as a nursing care bed, a user's trial period is typically provided before the user actually purchases or rents it (such a period is hereinafter referred to as an "evaluation period"). During this evaluation period, the server 10 executes processing of judging whether or not the installment of sensors is appropriate, collecting various data using the sensors, and applying for application of a nursing care insurance, for example. In addition, based on the result obtained in this evaluation period, the user can decide an item that he/she actually purchases or rents. This embodiment relates to processing of the server 10 in this evaluation period. Note that, the third embodiment described above corresponds to the processing of the server 10 during a period prior to the evaluation period.

4.1 About Configuration of Server 10

Figure 17:
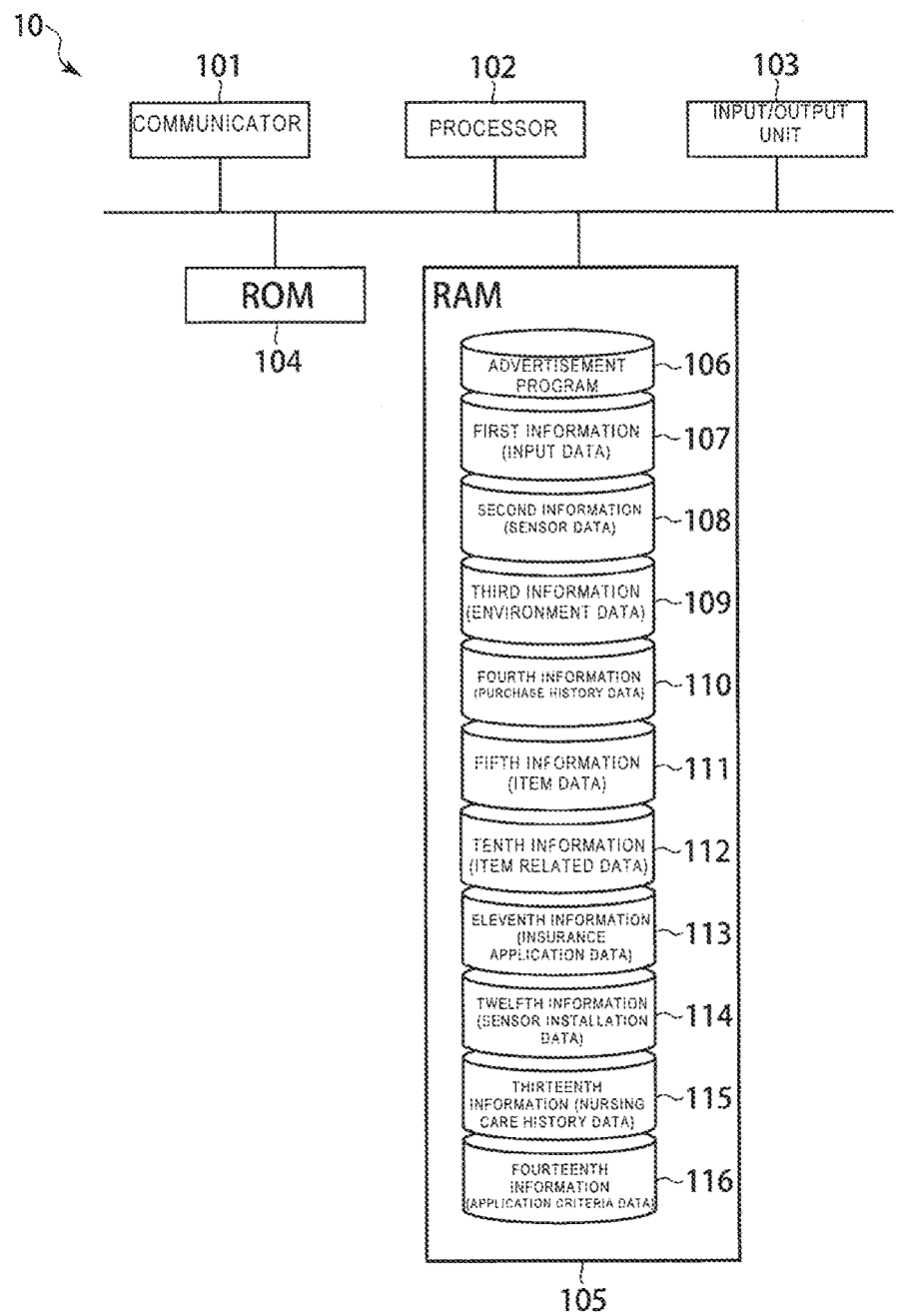
FIG. 17 is a block diagram of a server according to a fourth embodiment.

FIG. 17 is a block diagram illustrating an example of the hardware configuration of the server 10 according to this embodiment. As illustrated in the drawing, in the configuration of FIG. 13 illustrated in the third embodiment, the RAM 105 of the server 10 further holds twelfth information 114, thirteenth information 115, and fourteenth information 116, for example. The advertisement program 106 according to this embodiment has functions of supporting the user when the user uses the item and judging whether or not the nursing care insurance is to be applied in addition to the functions described in the first to third embodiments. Needless to say, other programs may be prepared separately in addition to the advertisement program 106 for executing these functions.

The twelfth information 114 includes information on positions where sensors can be mounted in items, such as a bed and a wheelchair, on which sensors are mountable. In addition, in addition to the information on the sensor mountable positions, the twelfth information may include information on one or more of the sensor mountable positions especially recommended and information on sensor mounting procedures.

The third information 115 is nursing care history data. Specifically, the third information 115 is information similar to the eighth information 209 illustrated in the second embodiment, and is information obtained by receiving the information 209 from the information terminal 20*b*, for example.

The fourteenth information 116 includes data on the certification criteria in the nursing care insurance system. The certification criteria is as illustrated in the first embodiment.

Figure 18:
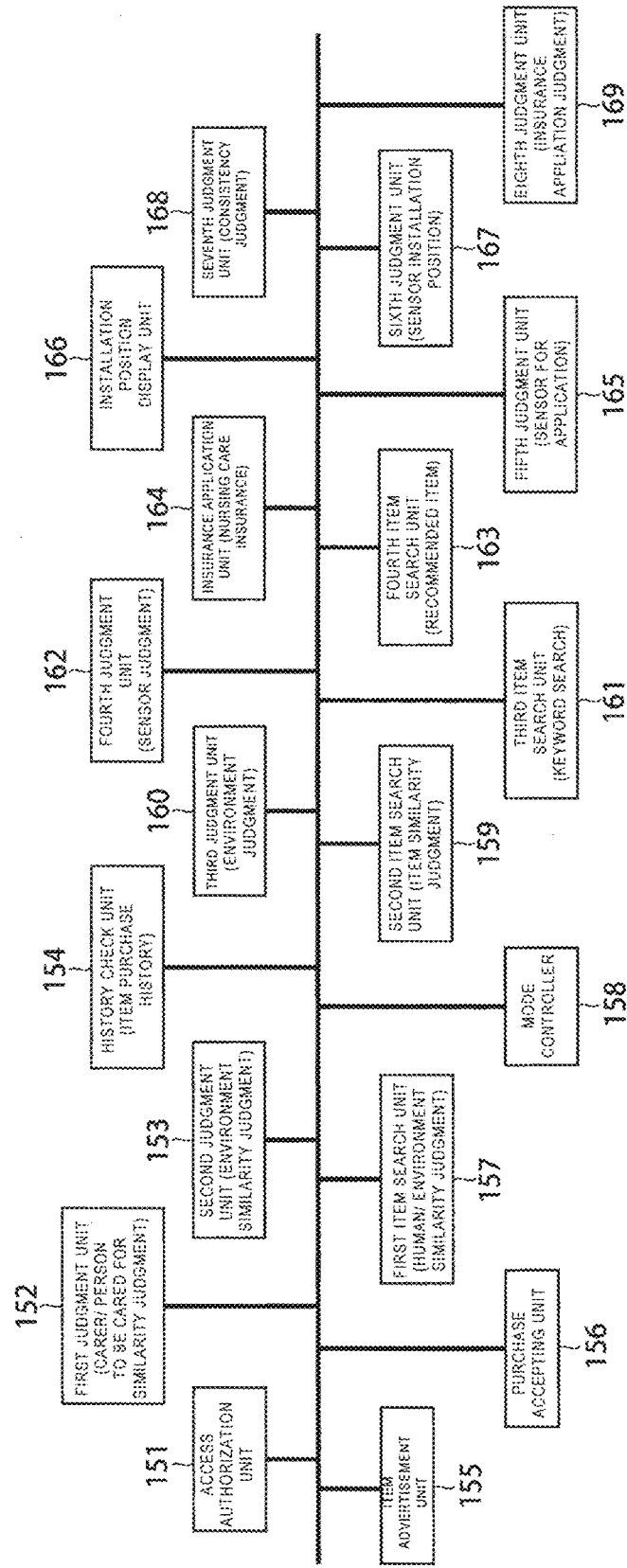
FIG. 18 is a functional block diagram of a processor of the server according to the fourth embodiment.

As described previously, in addition to the functions illustrated in FIG. 5 of the first embodiment and FIG. 15 of the third embodiment, the advertisement program 106 further supports the user in mounting the sensors in the bed, judges user's personality, and judges whether or not the nursing care insurance is to be certified. FIG. 18 is a functional block diagram of the processor 102 at the time of executing the advertisement program 106 according to this embodiment. As illustrated in the drawing, in addition to the functions of FIG. 14 illustrated in the third embodiment, the processor 102 further functions as an installation position display unit 166, a sixth judgment unit 167, a seventh judgment unit 168, and an eighth judgment unit 169.

The installation position display unit 166 is configured to display, on the information terminal 20*a* and/or information terminal 20*b* of the user, positions where sensors can be mounted or positions where sensors are mounted in an item such as a bed. The sixth judgment unit 167 is configured to judge whether or not the sensor installation positions are appropriate. The seventh judgment unit 168 is configured to judge the consistency between, for example: the information on the carer and/or the person to be cared for acquired in Step S139 of FIG. 15 illustrated in the third embodiment and the first information 107 and the third information 109 indicated in FIGS. 3A and 3C illustrated in the first embodiment; and the actual measurement results by the sensors and the like. The eighth judgment unit 169 is configured to judge whether or not the nursing care insurance is applicable to the person to be cared for.

4.2 Operation

Figure 19:
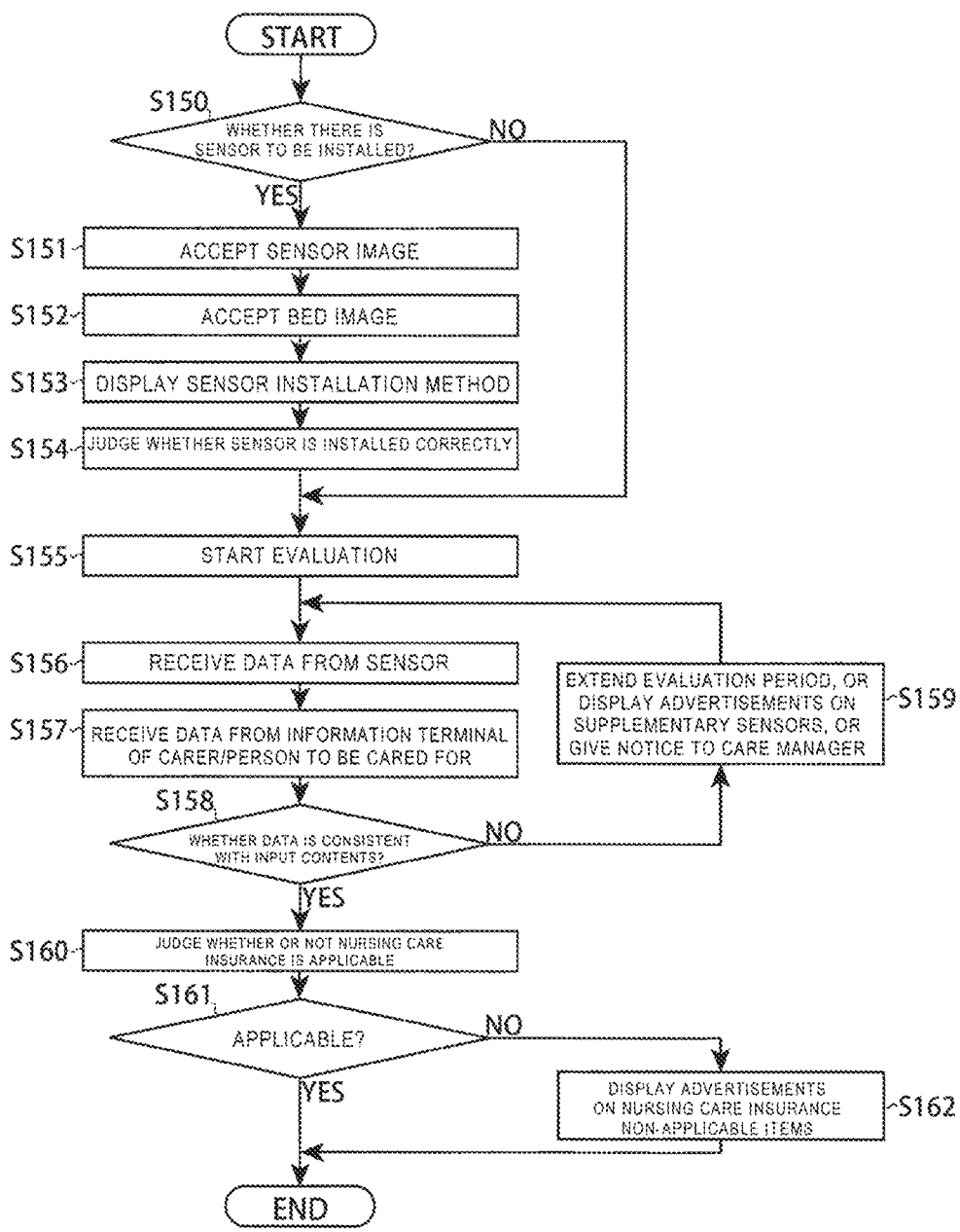
FIG. 19 is a flowchart illustrating an operation of the server according to the fourth embodiment.

Next, the operation of the advertisement providing system according to this embodiment is described while particularly focusing on the operation of the server 10. FIG. 19 is a flowchart illustrating the operation of the server 10, and the processes in this drawing are executed mainly by the processor 102. In this example, a description is given while taking, as an example, a case in which the first user (the carer A and the person to be cared for A') rents a nursing care bed through the website of this advertisement providing system while applying for the application of the nursing care insurance system using the method illustrated in the third embodiment.

In Step S142 in FIG. 15 of the third embodiment, the nursing care bed is shipped to the first user. Then, the evaluation period described above begins. If there is a sensor that should be installed in the bed thus rented (Step S150, YES), the server 10 accepts image data of a sensor held by the first user (Step S151). Specifically, the information terminal 20a or 20b of the first user is a smartphone equipped with a camera function, for example, and the user takes an image of the sensor using this camera function and sends this data to the server 10. Subsequently, the server 10 accepts image data of the bed (Step S152). Specifically, the first user takes an image of the bed using the information terminal 20a or 20b, and sends this data to the server 10.

Figure 20A:
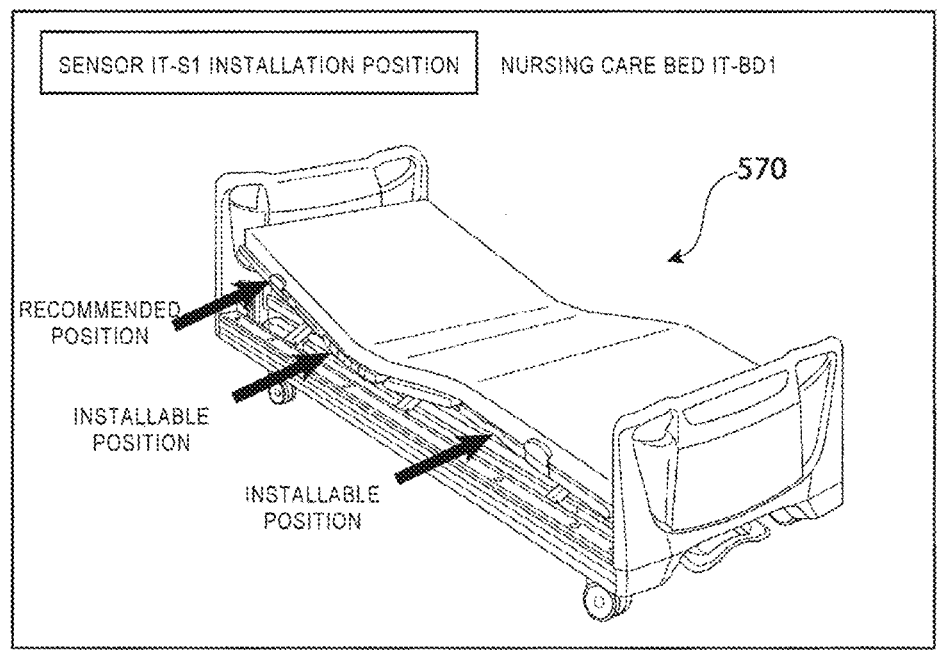
FIG. 20A is a conceptual diagram illustrating an example of a user terminal screen observed when an advertisement method according to the fourth embodiment is executed.

Then, with receipt of the bed image and/or receipt of the sensor image as a trigger, for example, the installation position display unit 166 causes the information terminal 20a and/or information terminal 20b to display the sensor installation method using AR (Augmented Reality), for example (Step S153). FIG. 20A illustrates how this process goes. FIG. 20A illustrates a display screen of the information terminal 20a or 20b of the first user. As illustrated in the drawing, three sensor installable positions are indicated by arrows on bed image data 570 thus taken, and one of such positions is indicated as a recommended position. In this processing, the fourth judgment unit 162 identifies the type of the sensor based on the sensor image and identifies the type of the bed based on the bed image, for example. Then, the installation position display unit 166 identifies sensor installable positions based on the twelfth information 114 (sensor installation data), for example. In this event, in FIG. 20A, the installation position display unit 166 may accept selection of a preferred installation position by the first user, and display a detailed method of installing the sensor at the preferred installation position thus accepted. For example, the installation position display unit 166 can magnify an image of the area at and around the preferred installation position to notify the first user of the sensor installation method together with textual information and voice information.

Figure 20B:
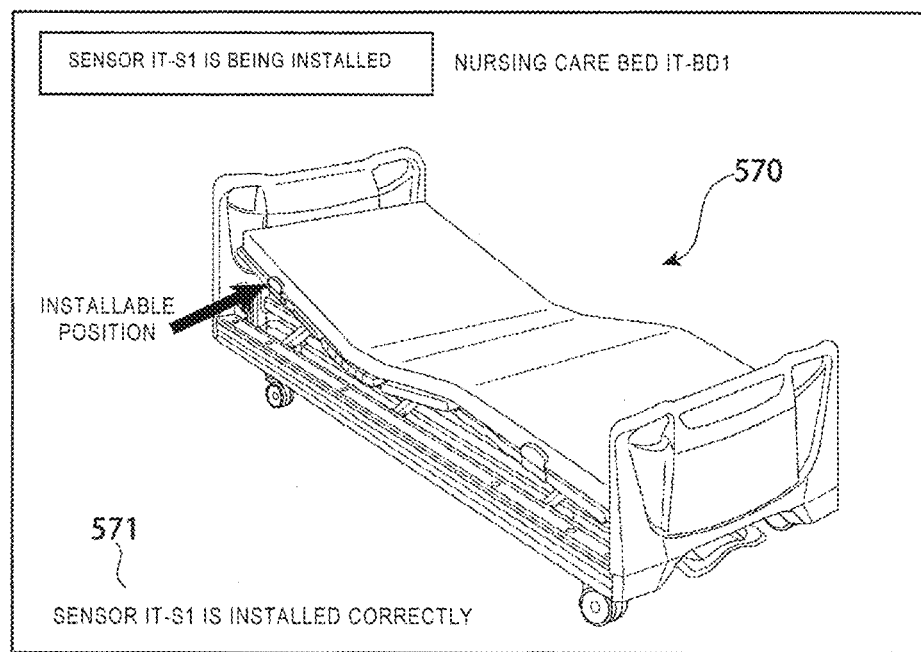
FIG. 20B is a conceptual diagram illustrating an example of the user terminal screen observed when the advertisement method according to the fourth embodiment is executed.
Figure 20C:
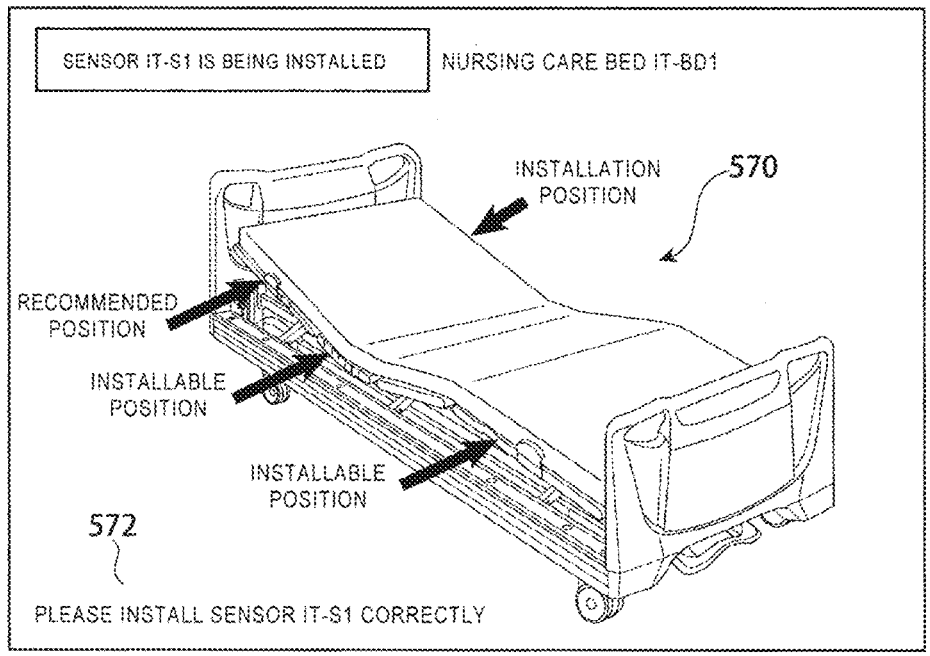
FIG. 20C is a conceptual diagram illustrating an example of the user terminal screen observed when the advertisement method according to the fourth embodiment is executed.

Once the first user installs the sensor in the bed, the sixth judgment unit 167 judges whether or not the sensor is installed correctly at the appropriate position (Step S154). Specifically, for example, the sixth judgment unit 167 judges whether or not the sensor installation position is appropriate by receiving sensor image from the first user again, and judges whether or not the installation method is correct by receiving a test signal from the sensor thus installed. Then, if the installation position and/or the installation method are wrong, the installation position display unit 166 causes the information terminal 20b or 20b of the first user to display the sensor installation position and method again. FIG. 20B illustrates an example of a display screen of the information terminal 20a or 20b observed when the sensor is correctly installed, whereas FIG. 20C illustrates an example of a display screen observed when the sensor is wrongly installed.

If the sensor is correctly installed in the bed, actual evaluation starts (Step S155). Specifically, the server 10 receives data from the sensor continuously or discretely (Step S156) to acquire the second information 108 illustrated in the first embodiment. In addition, the server 10 receives the information on the nursing care contents, illustrated in the second embodiment, from the information terminal 20a and/or information terminal 20b of the first user (Step S157) to acquire the thirteenth information 115 (nursing care history data).

Subsequently, the seventh judgment unit 168 judges the condition of the carer and/or the person to be cared for based on the result obtained from the second information 108 and the thirteenth information 115. Then, the seventh judgment unit 168 judges whether or not the condition thus obtained is consistent with the condition reported by the first user (the first information (input data) 107, the third information (environment data) 109, and the eleventh information (insurance application data) 113) (Step S158).

For example, the sensor used by the user includes sensors that collect vital data such as a blood pressure, the heart rate, the breathing rate, and a body movement on the bed. Then, the sensor sends the acquired vital data to the server 10. Thereby, when getting up of the person to be cared for is detected based on the vital data, for example, the sensor that is installed in the bed and capable of detecting the back raising operation of the bed can detect whether this event is caused due to the back raising operation of the bed or because the person to be cared for gets up by himself/herself. If the number of getting up events using the back raising operation is equal to or smaller than a predetermined threshold, for example, the sensor can judge that the person to be cared for can get up by himself/herself.

In addition, standing up of the person to be cared for can be judged by a pressure variation based on the weight. For example, when the person to be cared for stands up while leaning on something, his/her weight is conceivably charged locally on a certain spot on the bed. In other words, it is possible to judge that the person to be cared for finds it difficult to stand up by himself/herself if the area of the bed in which the weight is charged is small, the pressure in this area becomes larger, and the period needed until this pressure becomes zero is longer than a predetermined period.

Further, the sensor capable of collecting the above vital data can judge rolling over in bed based on how often the person to be cared for rolls over in bed. For example, it is possible to judge that the person to be cared for cannot roll over in bed by himself/herself if the time interval in rolling over in bed is longer than a predetermined period.

The thirteenth information (nursing care history data) 115 is used in terms of taking a meal and bathing. Specifically, it is possible to judge that the person to be cared for can take a meal and take a bath by himself/herself if the rate at which the person to be cared for makes no meal and bathing requests after moving away from the bed is a predetermined value or larger. However, if the person to be cared for makes no meal and bathing requests but does not move away from the bed either, it is possible to judge that the person to be cared for lives on the bed most of the time.

In this way, the seventh judgment unit 168 judges the consistency between the information actually obtained from the sensors and the information reported by the user. Then, if these two are inconsistent with each other (Step S158, NO), the seventh judgment unit 168 extends the evaluation period, or displays advertisements on supplementary sensors on the information terminal 20a and/or information terminal 20b, or gives notice to the care manager (Step S159).

Figure 20D:
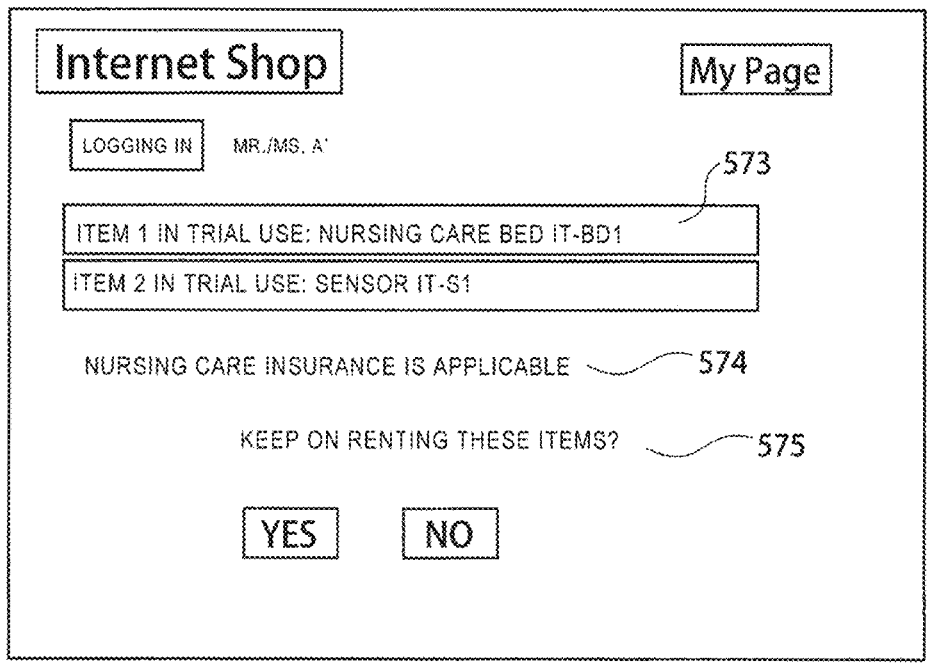
FIG. 20D is a conceptual diagram illustrating an example of the user terminal screen observed when the advertisement method according to the fourth embodiment is executed.

If these two are consistent with each other (Step S158, YES), the eighth judgment unit 169 judges whether or not the nursing care insurance is applicable (Step S160). As described previously, in the current Japanese nursing care insurance system, whether or not the person to be cared for can receive the nursing care insurance services is determined based on whether or not he/she is certified as being in the assistance needed condition. Although final judgment is made by the nursing care certification examining board established in the local authority, the criteria for the care needed condition is clearly defined and thus it is possible to presume, to some extent, whether or not the person to be cared for is likely to be certified as being in this condition prior to the application. Specifically, the eighth judgment unit 169 calculates the possibility for the person to be cared for to achieve the nursing care need certification by identifying the current condition of the person to be cared for based on the first information (input data) 107, the second information (sensor data) 108, the third information (environment data) 109, the eleventh information (insurance application data) 113, and the thirteenth information (nursing care history data) 115 and comparing it with the fourteenth information (nursing care need certification criteria data) 116. Then, if there is a possibility to a certain extent or higher (Step S161, YES), the eighth judgment unit 169 judges that the nursing care insurance is to be applied, and then displays a screen illustrated in FIG. 20D on the information terminal 20a and/or information terminal 20b, for example. In FIG. 20D, together with item information 573 that the person to be cared for is renting, information 574 informing that the nursing care insurance is applicable and an inquiry 575 on whether or not to keep on renting the items are displayed.

Figure 20E:
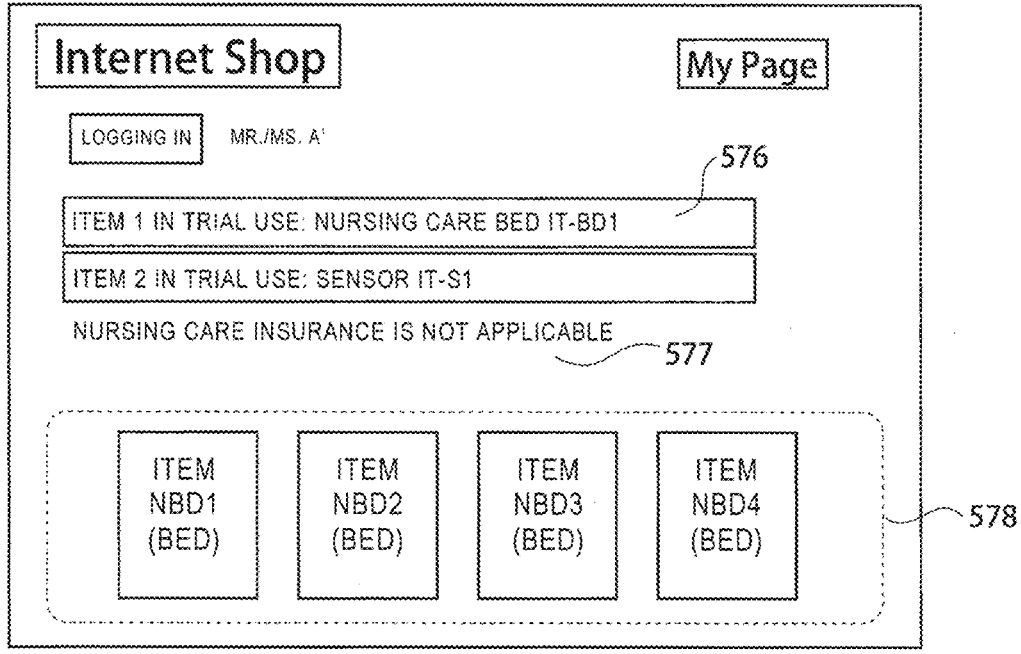
FIG. 20E is a conceptual diagram illustrating an example of the user terminal screen observed when the advertisement method according to the fourth embodiment is executed.

On the other hand, if there is a possibility lower than a certain extent (Step S161, NO), the eighth judgment unit 169 judges that no nursing care insurance is to be applied, and then displays a screen illustrated in FIG. 20E on the information terminal 20a and/or information terminal 20b, for example. In FIG. 20E, together with information 577 informing that the nursing care insurance is not applicable to the person to be cared for, advertisements 578 on normal beds not for nursing care which are searched by the fourth item search unit 163 are displayed (Step S162), for example.

4.3 Effect According to this Embodiment

According to this embodiment, the user can install a sensor in an item easily by use of AR and the like, which improves the user-friendliness.

In addition, according to this embodiment, the server 10 collects sensor data during the evaluation period, and knows the conditions of the carer and/or the person to be cared for based on the sensor data thus collected. As a result, the server 10 can judge the validity of the information reported by the user. Further, if the information is valid enough, the server 10 can judge whether or not the person to be cared for can achieve the nursing care insurance certification based on the acquired information, which makes it possible to reduce the complexity in applying for the nursing care insurance.

Further, based on the validity of the information, the server 10 can know the personalities of the carer and/or the person to be cared for. Specifically, various cases are assumed including a case in which the nursing care actually needed is consistent with the reported information, a case in which the nursing care level actually needed is quite heavier than the reported information, and in which the nursing care level actually needed is by contrast quite lower than the reported information, and the personalities of the carer and/or the person to be cared for are conceivably different depending on which case the user is in. According to the personalities thus obtained, the server 10 can determine items to be advertised.

5. Fifth Embodiment

Next, an information processor according to a fifth embodiment is described. This embodiment relates to an advertisement method executed after the evaluation period illustrated in the fourth embodiment described above and during a phase in which the person to be cared for actually rents an item.

5.1 About Configuration of Server 10

Figure 21:
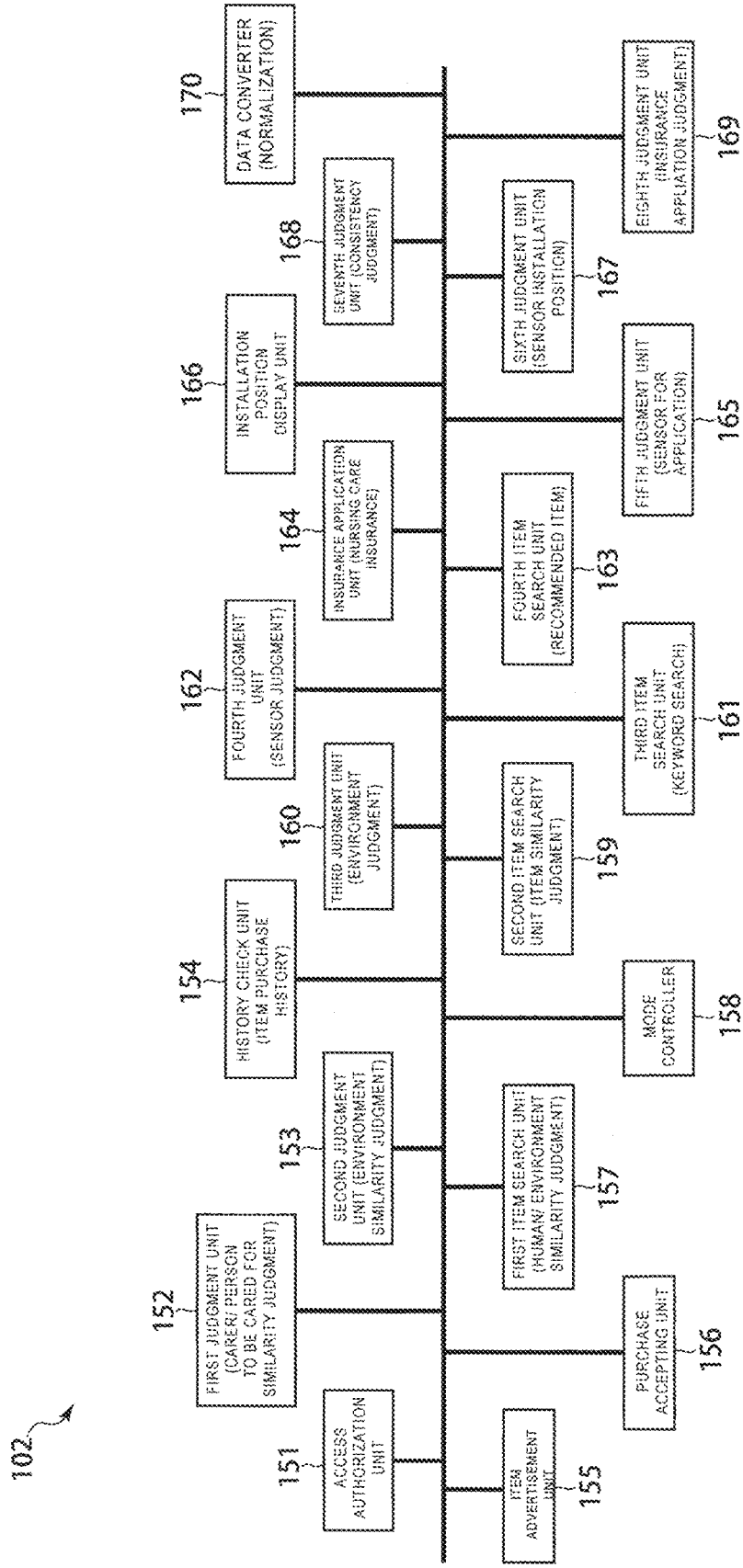
FIG. 21 is a functional block diagram of a processor of a server according to a fifth embodiment.

The hardware configuration of the server 10 according to this embodiment is similar to that of FIG. 17 illustrated in the fourth embodiment, for example. FIG. 21 is a functional block diagram of the processor 102 observed when the advertisement program 106 according to this embodiment is executed. As illustrated in the drawing, the processor 102 can function as a data converter 170. The data converter 170 is configured to convert data, acquired from the sensors, according to predetermined criteria. The data converter 170 will be described in detail later in Section 5.2 below.

5.2 Operation

Figure 22:
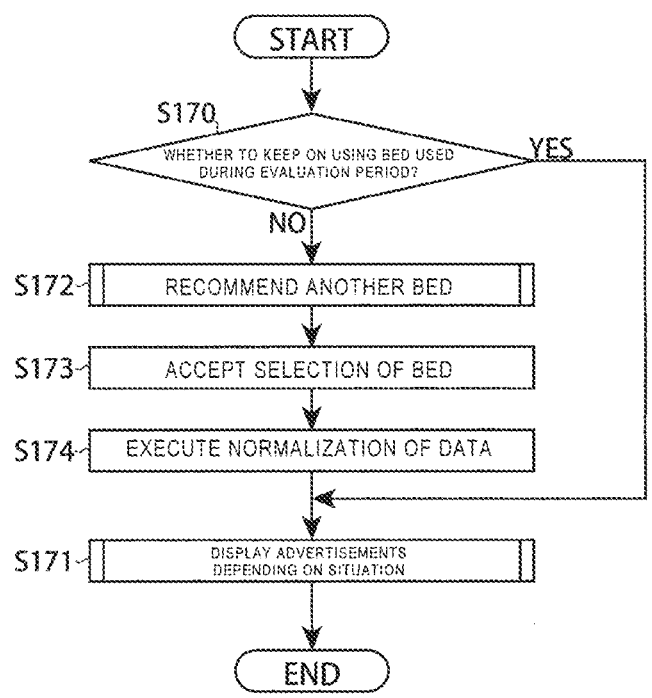
FIG. 22 is a flowchart illustrating an operation of the server according to the fifth embodiment.

Next, the operation of the advertisement providing system according to this embodiment is described while particularly focusing on the operation of the server 10. FIG. 22 is a flowchart illustrating the operation of the server 10, and the processes in this drawing are executed mainly by the processor 102. In this example, a description is given while taking, as an example, a case in which the first user (the carer A and the person to be cared for A') illustrated in the first embodiment rents a nursing care bed after the evaluation period through the website of this advertisement providing system while applying for the application of the nursing care insurance system.

As illustrated in FIG. 20D of the fourth embodiment, upon ending of the evaluation period, the server 10 inquires the first user about whether to keep on renting the items in trial use (Step S170). If the first user is to keep on renting the items (Step S170, YES), the server 10 allows the first user to use the items. Then, the server 10 displays advertisements on the information terminals 20a and 20b of the first user using the method illustrated in the first embodiment (Step S171).

Meanwhile, the first user might want to rent an item different from that in the evaluation period (Step S170). In this case, the server 10 recommends (displays advertisements on) another nursing care bed to the first user (Step S172). In this case, the server 10 may recommend a new item using the method of Steps S105 to S107 illustrated in the first embodiment, for example. In this method, the server 10 determines a recommended item based on the similarity between the users and the environments. As another method, the server may recommend a new item using the method of Step S136 described in the third embodiment. In this method, based on the items (such as the sensors) already held by the user, the server 10 recommends an item suitable for these items.

Then, if the first user rents a new bed (Step S173), the data converter 170 of the server 10 executes normalization of data received from the sensors (Step S174), and subsequent judgment on the user's conditions is made based on the normalized data. Normalization is described herein. As in this example, the bed (and/or sensor) used during the evaluation period might be different from a bed (and/or sensor) the user is to actually rent. In this case, even when the same sensor is used, for example, data obtained might be different from each other if the types of the beds where the sensor is installed are different or the locations where the sensor is installed are different. If we take a simple example, while a weight of 50 kg is achieved as weight information from a certain combination of bed and sensor, a weight of 5 kg might be achieved as weight information from another combination of bed and sensor. Needless to say, using the latter information without modification causes an erroneous analysis of the user's situation, and therefore it is necessary to normalize data to convert the weight data of 5 kg to the weight data of 50 kg. This is what we call data normalization. The same goes for data other than weight data.

Note that, in the event of data normalization, it is preferable to apply basic data correlation to other data conversion, and data appropriate as the basic data is the weight described previously. At the time of data normalization, data acquired from the beds are normalized using the respective different functions. Assume a case in which the function is represented as Weight W(XX)=f1(p) when a certain bed XX is used, while the function is represented as W(YY)=f2(p) when another bed YY is used. Here, p indicates the sensor installation position, and f1 and f2 indicate functions regarding the sensor installation position. In this case, once the relationship of f1=g(f2) is derived, normalization of other data is possible using the function g.

5.3 Effect According to this Embodiment

According to this embodiment, it is possible to provide effective item advertisements to the user even when an item of the type different from that of the item having been used during the evaluation period is used after the evaluation period. In addition, with the data normalization, it is possible to enhance the credibility of data acquired from the sensor.

6. Modification Example Etc.

As described above, the information processors according to the embodiments each include the processor and the memory. The memory holds: first information (A/A', FIG. 3A) on the relationship between a first assistant and a first person to be assisted who is assisted by the first assistant; second information (B/B', FIG. 3A) on the relationship between a second assistant and a second person to be assisted who is assisted by the second assistant; third information (110, FIG. 2) on the item purchase history of the first assistant and/or the first person to be assisted; and fourth information (110, FIG. 2) on the item purchase history of the second assistant and/or the second person to be assisted. The processor judges the similarity between the first information (A/A') and the second information (B/B') (user-similarity, S102, FIG. 5). Then, if judging that a similarity is observed between the first information and the second information, the processor provides the first assistant and/or the first person to be assisted (A/A') with advertisements based on the fourth information (110 for B/B') (S103, FIG. 5).

In addition, the memory holds: fifth information (A/A'=CN1, FIG. 3C) on the life environment of the first assistant and/or the first person to be assisted; and sixth information (B/B'=CN2, FIG. 3C) on the life environment of the second assistant and/or the second person to be assisted, and the processor judges the similarity between the fifth information (CN1) and the sixth information (CN1) (condition-similarity, S102, FIG. 5). Then, if judging that a similarity is observed between the first information and the second information and a similarity is observed between the third information and the fourth information, the processor provides the first assistant and/or the first person to be assisted (A/A') with advertisements based on the fourth information (110 for B/B') (S103, FIG. 5).

According to this configuration, it is possible to provide more useful items to the user. Note that, the embodiments described above are merely an example and can be modified in various ways. For example, the above embodiments have been described with the example in which the server 10 searches for another user who is similar in the relationship between the carer and the person to be cared for and in life environment, and determines items to be advertised based on this result. However, the server may employ a user if a similarity is observed in terms of only one of the relationship between the carer and the person to be cared for and their life environments. In other words, although the server searches for a user who is similar in terms of the two factors, the server may search for a user who is similar in terms of only one of these factors. For example, in FIG. 6, the server may search for a user who is similar in terms of only one of the relationship in the vertical axis and the relationship in the horizontal axis. The same goes for the second embodiment and later.

Further, the above embodiments have been described with the example in which the user mainly rents a nursing care bed and rents a sensor as its accessory. However, items that the user can rent are of course not limited to the combination of bed and sensor.

Note that, the above embodiments include the following aspects. Specifically, the aspects are as follows.

[1]

An information processor including:
a processor; and
a memory, in which
the memory holds:
first information on a relationship between a first assistant and a first person to be assisted who is assisted by the first assistant;
second information on a relationship between a second assistant and a second person to be assisted who is assisted by the second assistant;
third information on an item purchase history of the first assistant and/or the first person to be assisted; and fourth information on an item purchase history of the second assistant and/or the second person to be assisted, and the processor judges a similarity between the first information and the second information, and provides an advertisement based on the fourth information to the first assistant and/or the first person to be assisted if judging that a similarity is observed between the first information and the second information.

[2]

The information processor according to claim 1, in which, in the above section [1], the memory further holds:

fifth information on a life environment of the first assistant and/or the first person to be assisted; and sixth information on a life environment of the second assistant and/or the second person to be assisted, and the processor further judges a similarity between the fifth information and the sixth information, and provides an advertisement based on the fourth information to the first assistant and/or the first person to be assisted if judging that a similarity is observed between the first information and the second information and a similarity is observed between the fifth information and the sixth information.

[3]

The information processor according to claim 1, in which, in the above section [1], if judging that a similarity is observed between the first information and the second information, the processor provides an advertisement to the first assistant based on information, out of the fourth information, on the second assistant, and provides an advertisement to the first person to be assisted based on information, out of the fourth information, on the second person to be assisted.

[4]

In the above section [1] or [3], the memory further holds an item database, and upon accepting an item search request from the first assistant or the first person to be assisted, the processor searches for items in the item database based on the item search request, and if judging that a similarity is observed between the first information and the second information, provides an advertisement on a first item group, out of the items thus searched for, which has been purchased by the second assistant and the second person to be assisted.

[5]

In the above section [2], if judging that a similarity is observed between the first information and the second information and a similarity is observed between the fifth information and the sixth information, the processor provides an advertisement to the first assistant based on information, out of the fourth information, on the second assistant, and provides an advertisement to the first person to be assisted based on information, out of the fourth information, on the second person to be assisted.

[6]

In the above section [2] or [5], the memory further holds an item database, and upon accepting an item search request from the first assistant or the first person to be assisted, the processor searches for items in the item database based on the item search request, and if judging that a similarity is observed between the first information and the second information and a similarity is observed between the fifth information and the sixth information, provides an advertisement on a first item group, out of the items thus searched for, which has been purchased by the second assistant and the second person to be assisted.

[7]

In the above section [2], the memory further holds:

seventh information on a relationship between a third assistant and a third person to be assisted who is assisted by the third assistant;

eighth information on a life environment of the third assistant and/or the third person to be assisted;

ninth information on an item purchase history of the third assistant and/or the third person to be assisted; and an item database, and upon accepting an item search request from the first assistant or the first person to be assisted, the processor searches for items in the item database based on the item search request, and if judging that a similarity is observed among the first information, the second information, and the seventh information, and a similarity is observed among the fifth information, the sixth information, and the eighth information, provides an advertisement on a first item group, out of the items thus searched for, which has been purchased by the second assistant and/or the second person to be assisted and has been purchased by the third assistant and/or the third person to be assisted.

[8]

In the above section [4] or [6], the first item group includes a first item and a second item, and if accepting a request to select any of the items in the first item group and further accepting a command to get the advertisement back to the previous one from the first assistant or the first person to be assisted, the processor provides an advertisement on the first item group in a first mode, and provides an advertisement on a second item group, which is of the same type as the item selected in the selection request, in a second mode.

[9]

In the above section [2], the processor receives, from a first device, an operation condition of beds used by the first person to be assisted and the second person to be assisted and/or vital data of the first person to be assisted and the second person to be assisted, and obtains the fifth information and the sixth information based on the vital data received from the first device.

[10]

An information processing method including:

causing a processor to retrieve, from a memory, first information on a relationship between a first assistant and a first person to be assisted, who is assisted by the first assistant, and second information on a life environment of the first assistant and/or the first person to be assisted;

causing the processor to search for a second assistant and a second person to be assisted, who is assisted by the second assistant, the relationship between which is similar to that in the first information; and causing the processor to provide the first assistant and/or the first person to be assisted with an advertisement based on a purchase history of the second assistant and/or the second person to be assisted.

[11]

In the above section [10], the method further includes causing the processor to retrieve, from the memory, second information on a life environment of the first assistant and/or the first person to be assisted, and the processor searches for the second assistant and the second person to be assisted, the relationship between which is similar to that in the first information and the life environment of which is similar to that in the second information.

[12]

In the above section [10] or [11], the method further includes:

causing the processor to accept an item search request from the first assistant or the first person to be assisted;

causing the processor to search for items based on the item search request; and causing the processor to provide an advertisement on a first item group, out of the items thus searched for, which has been purchased by the second assistant and the second person to be assisted.

[13]

In the above section [10] or [11], the method further includes:

causing the processor to accept an item search request from the first assistant or the first person to be assisted;

causing the processor to search for items based on the item search request; and causing the processor to provide an advertisement on a first item group, out of the items thus searched for, which has been purchased by the second assistant and the second person to be assisted.

[14]

In the above section [11], the method further includes:

causing the processor to search for the second assistant and the second person to be assisted, the relationship between which is similar to that in the first information and the life environment of which is similar to that in the second information; and causing the processor to provide an advertisement to the first assistant based on the purchase history of the second assistant and provide an advertisement to the first person to be assisted based on the purchase history of the second person to be assisted.

[15]

In the above section [11] or [14], the method further includes:

causing the processor to accept an item search request from the first assistant or the first person to be assisted;

causing the processor to search for items based on the item search request; and causing the processor to search for the second assistant and the second person to be assisted, the relationship between which is similar to that in the first information and the life environment of which is similar to that in the second information.

[16]

In the above section [11], the method further includes:

causing the processor to retrieve, from the memory, third information on the relationship between the second assistant and the person to be assisted who is assisted by the second assistant, fourth information on a relationship between a third assistant and a third person to be assisted who is assisted by the third assistant, fifth information on a life environment of the third assistant and/or the third person to be assisted, and sixth information on the life environment of the second assistant and/or the second person to be assisted;

causing the processor to accept an item search request from the first assistant or the first person to be assisted;

causing the processor to search for items based on the item search request; and causing the processor to provide, if judging that a similarity is observed among the first information, the third information, and the fourth information, and a similarity is observed among the second information, the fifth information, and the sixth information, an advertisement on a first item group, out of the items thus searched for, which has been purchased by the second assistant and/or the second person to be assisted and has been purchased by the third assistant and/or the third person to be assisted.

[17]

In the above section [13], the first item group includes a first item and a second item, and the method further includes causing, if the processor accepts a request to select any of the items in the first item group and further accepts a command to get the advertisement back to the previous one from the first assistant or the first person to be assisted, the processor to provide an advertisement on the first item group in a first mode, and provide an advertisement on a second item group, which is of the same type as the item selected in the selection request, in a second mode.

[18]

In the above section [15], the first item group includes a first item and a second item, and the method further includes causing, if the processor accepts a request to select any of the items in the first item group and further accepts a command to get the advertisement back to the previous one from the first assistant or the first person to be assisted, the processor to provide an advertisement on the first item group in a first mode, and provide an advertisement on a second item group, which is of the same type as the item selected in the selection request, in a second mode.

[19]

In the above section [11], the method further includes:

causing the processor to receive, from a first device, an operation condition of beds used by the first person to be assisted and the second person to be assisted and/or vital data of the first person to be assisted and the second person to be assisted, and causing the processor to obtain the second information based on the vital data received from the first device.

Note that, the present invention is not limited to the above embodiments, and can be modified in various ways in its practical phase without departing from the gist thereof. In addition, these embodiments may be executed in combination as needed, and a combined effect can be obtained in this case. Further, the embodiments include various inventions which can be extracted by selecting some of the constituent factors disclosed and combining the same. For example, a configuration obtained by deleting some of all the constituent factors illustrated in the embodiments can be extracted as an invention as long as such configuration can solve the problem and bring about an effect.

The invention claimed is:
1. An apparatus comprising:
a processor configured to,
determine first information on a first care situation between a first caregiver and a first person to be cared for by the first caregiver based on a first input received from the first caregiver or the first person the first care situation identifying at least one of differences or similarities between the first person to be cared for and the first caregiver; and
a memory configured to store,
the first information;
second information on a second care situation between a second caregiver and a second person to be cared for by the second caregiver, the second care situation identifying at least one of differences or similarities between the second person and the second caregiver;
third information on a purchase history of the first caregiver or the first person; and
fourth information on a purchase history of the second caregiver or the second person, wherein
the processor is configured to
determine a similarity between the first information and the second information,
provide an advertisement based on the fourth information to the first caregiver or the first person if the processor determines that the first information is similar to the second information,
determine whether a first sensor is correctly installed based on a test signal received from the first sensor, the first sensor configured to monitor the first care situation when the first person uses an item advertised based on the fourth information,
control the first sensor to automatically gather measurement values of the first person, in response to determining that the first sensor is correctly installed,
determine whether the first input is consistent with the measurement values, and
provide a further advertisement to the first person or the first caregiver based on the determination of whether the first input is consistent with the measurement values.
2. The apparatus according to claim 1, wherein
the memory further stores,
fifth information on an environment situation of the first caregiver or the first person; and
sixth information on an environment situation of the second caregiver or the second person, and
the processor is configured to,
determine whether the fifth information is similar to the sixth information, and
provide an advertisement based on the fourth information to the first caregiver or the first person if the processor determines that the first information is similar to the second information and the fifth information is similar to the sixth information.
3. The apparatus according to claim 2, wherein, if the processor determines that the first information is similar to the second information and the fifth information is similar to the sixth information, the processor is configured to:
provide an advertisement to the first caregiver based on information, out of the fourth information, on the second caregiver, and
provide an advertisement to the first person based on information, out of the fourth information, on the second person.
4. The apparatus according to claim 2, wherein
the memory further stores an item database, and
upon receiving an item search request from the first caregiver or the first person, the processor is configured to:
search for items in the item database based on the item search request, and
provide an advertisement on a first item group, out of the items, which has been purchased by the second caregiver or the second person if the processor determines that the first information is similar to the second information and the fifth information is similar to the sixth information.
5. The apparatus according to claim 4, wherein
the first item group includes a first item and a second item, and
if receiving a request to select any of the items in the first item group and further receiving a command to go back to a previous page from the first caregiver or the first person, the processor is configured to:
provide an advertisement on the first item group in a first mode, and
provide an advertisement on a second item group, which is of the same type as the item selected in the selection request, in a second mode.
6. The apparatus according to claim 2, wherein
the memory further stores,
seventh information on a third care situation between a third caregiver and a third person to be assisted by the third caregiver;
eighth information on an environment situation of the third caregiver or the third person;
ninth information on a purchase history of the third caregiver or the third person; and
an item database, and
upon receiving an item search request from the first caregiver or the first person, the processor is configured to,
search for items in the item database based on the item search request, and
provide an advertisement on a first item group, out of the items, which has been purchased by the second caregiver or the second person and has been purchased by the third caregiver or the third person if the processor determines that the first information is similar to the second information and the seventh information, and the fifth information is similar to the sixth information and the eighth information.
7. The apparatus according to claim 2, wherein the processor is configured to:
receive, from a first device, a condition of beds used by the first person and the second person or vital data of the first person and the second person, and
obtain the fifth information and the sixth information based on the vital data received from the first device.
8. The apparatus according to claim 1, wherein, if the processor determines that the first information is similar to the second information, the processor is configured to:
provide an advertisement to the first caregiver based on information, out of the fourth information, on the second caregiver, and
provide an advertisement to the first person based on information, out of the fourth information, on the second person to be assisted.

9. The apparatus according to claim 1, wherein
the memory further stores an item database, and
upon receiving an item search request from the first caregiver or the first person, the processor is configured to:
search for items in the item database based on the item search request, and
provide an advertisement on a first item group, out of the items, which has been purchased by the second caregiver or the second person if the processor determines that the first information is similar to the second information.

10. The apparatus according to claim 9, wherein
the first item group includes a first item and a second item, and
if receiving a request to select any of the items in the first item group and further receiving a command to go back to a previous page from the first caregiver or the first person, the processor is configured to:
provide an advertisement on the first item group in a first mode, and
provide an advertisement on a second item group, which is of the same type as the item selected in the selection request, in a second mode.

11. The apparatus of claim 1, wherein the first information includes at least one of:
at least one of differences or similarities between the first person to be cared for and the first caregiver including differences or similarities of at least one of
a weight of the first person to be cared for and the first caregiver,
a height of the first person to be cared for and the first caregiver, or
a sex of the first person to be cared for and the first caregiver; or
an indication of a relationship between the first person to be cared for and the first caregiver indicating necessary nursing care contents provided to the first person to be cared for by the first caregiver.

12. An information processing method comprising:
causing a processor to determine first information on a first care situation between a first caregiver and a first person to be cared for by the first caregiver based on a first input received from the first caregiver or the first person, the first care situation identifying at least one of differences or similarities between the first person to be cared for and the first caregiver;
causing the processor to retrieve, from a memory, the first information;
causing the processor to search for a second caregiver and a second person to be assisted by the second caregiver, a second care situation between the second caregiver and the second person being similar to the first care situation; and
causing the processor to provide the first caregiver or the first person with an advertisement based on a purchase history of the second caregiver or the second person;
causing the processor to determine whether a first sensor is correctly installed based on a test signal received from the first sensor, the first sensor configured to monitor the first care situation when the first person uses an item advertised based on the purchase history of the second caregiver or the second person;
causing the processor to control the first sensor to automatically gather measurement values of the first person, in response to determining that the first sensor is correctly installed;
causing the processor to determine whether the first input is consistent with the measurement values; and
causing the processor to provide a further advertisement to the first person or the first caregiver based on the determination of whether the first input is consistent with the measurement values.

13. The information processing method according to claim 12, further comprising causing the processor to retrieve, from the memory, second information on a first environment situation of the first caregiver or the first person, wherein
the processor is configured to search for the second caregiver and the second person, the second care situation being similar to the first care situation and a second environment situation of the second caregiver or the second person being similar to the first environment situation.

14. The information processing method according to claim 13, further comprising:
causing the processor to search for the second caregiver and the second person, the second care situation being similar to the first care situation and a second environment situation being similar to the first environment situation; and
causing the processor to provide an advertisement to the first caregiver based on the purchase history of the second caregiver and provide an advertisement to the first person based on the purchase history of the second person.

15. The information processing method according to claim 13, further comprising:
causing the processor to receive an item search request from the first caregiver or the first person;
causing the processor to search for items based on the item search request; and
causing the processor to search for the second caregiver and the second person, the second care situation being similar to the first care situation and an second environment situation being similar to the first environment situation.

16. The information processing method according to claim 15, wherein
a first item group includes a first item and a second item, and
the method further comprises causing, if the processor receives a request to select any of the items in the first item group and further receives a command to go back to a previous page from the first caregiver or the first person, the processor to
provide an advertisement on the first item group in a first mode, and
provide an advertisement on a second item group, which is of the same type as the item selected in the selection request, in a second mode.

17. The information processing method according to claim 13, further comprising:
causing the processor to retrieve, from the memory,
third information on the second care situation,
fourth information on a third care situation between a third caregiver and a third person to be assisted by the third caregiver,
fifth information on a third environment situation of the third caregiver or the third person, and
sixth information on the second environment situation;
causing the processor to receive an item search request from the first caregiver or the first person;

causing the processor to search for items based on the item search request; and causing the processor to provide, if the processor determines that the first information is similar to the third information and the fourth information, and the second information is similar to the sixth information and the fifth information, an advertisement on a first item group, out of the items, which has been purchased by the second caregiver or the second person and has been purchased by the third caregiver or the third person.

18. The information processing method according to claim 17, wherein the first item group includes a first item and a second item, and the method further comprises causing, if the processor receives a request to select any of the items in the first item group and further receives a command to go back to a previous page from the first caregiver or the first person, the processor to provide an advertisement on the first item group in a first mode, and provide an advertisement on a second item group, which is of the same type as the item selected in the selection request, in a second mode.

19. The information processing method according to claim 13, further comprising:

causing the processor to receive, from a first device, an operation condition of beds used by the first person and the second person or vital data of the first person and the second person, and causing the processor to obtain the second information based on the vital data received from the first device.

20. The information processing method according to claim 12, further comprising:

causing the processor to receive an item search request from the first caregiver or the first person;

causing the processor to search for items based on the item search request; and causing the processor to provide an advertisement on a first item group, out of the items, which has been purchased by the second caregiver or the second person.

* * * * *